United States Patent
Bluechel et al.

(10) Patent No.: US 12,485,212 B2
(45) Date of Patent: Dec. 2, 2025

(54) DIALYSATE REGENERATOR AND SYSTEM COMPRISING THE SAME

(71) Applicant: TEMASEK POLYTECHNIC, Singapore (SG)

(72) Inventors: Christian Gert Bluechel, Singapore (SG); Liutong Lin, Singapore (SG); Puay Meng Tang, I, Singapore (SG); Hua Zhang, Singapore (SG); Keng Hong Lee, Singapore (SG); Jui Pin Er, Singapore (SG)

(73) Assignee: TEMASEK POLYTECHNIC, Singapre (SG)

( * ) Notice: Subject to any disclaimer, the term of this patent is extended or adjusted under 35 U.S.C. 154(b) by 450 days.

(21) Appl. No.: 17/918,825

(22) PCT Filed: Apr. 13, 2021

(86) PCT No.: PCT/SG2021/050209
§ 371 (c)(1),
(2) Date: Oct. 13, 2022

(87) PCT Pub. No.: WO2021/211061
PCT Pub. Date: Oct. 21, 2021

(65) Prior Publication Data
US 2023/0347031 A1   Nov. 2, 2023

(30) Foreign Application Priority Data

Apr. 13, 2020 (SG) .......................... 10202003361W
Apr. 13, 2020 (SG) .......................... 10202003363P
Apr. 13, 2020 (SG) .......................... 10202003365X

(51) Int. Cl.
*A61M 1/16* (2006.01)
*A61M 1/14* (2006.01)
(Continued)

(52) U.S. Cl.
CPC ........ *A61M 1/1696* (2013.01); *A61M 1/1563* (2022.05); *A61M 1/1603* (2014.02);
(Continued)

(58) Field of Classification Search
CPC .............. A61M 1/1563; A61M 1/1603; A61M 1/1605; A61M 1/1607; A61M 1/1609;
(Continued)

(56) References Cited

U.S. PATENT DOCUMENTS 7,241,272 B2   7/2007   Karoor et al.
8,580,112 B2   11/2013  Updyke et al.
(Continued)

FOREIGN PATENT DOCUMENTS

EP        2612684 A2      7/2013
WO   WO 2002/043859 A2   6/2002
(Continued)

OTHER PUBLICATIONS

International Search Report and Written Opinion for PCT/SG2021/050209 (ISA/EP) mailed Jul. 20, 2021 (9 pages).
(Continued)

*Primary Examiner* — Dirk R Bass
(74) *Attorney, Agent, or Firm* — Viering, Jentschura & Partner mbB

(57) ABSTRACT

An aspect of the disclosure relates to a dialysate regenerator for connecting to a dialysis apparatus, the dialysate regenerator including a regenerator inlet for receiving dialysate; a regenerator outlet for dispensing regenerated dialysate; a hydraulic circuit connected between the regenerator inlet and the regenerator outlet, and further including a fluid portioning system to divide a dialysate flow into uniform portions for sequential regeneration An aspect of the disclosure relates to a dialysis system including a dialysis apparatus including: a fresh dialysate input; a spent dialysate
(Continued)

output; and the dialysate regenerator, wherein the regenerator inlet may be coupled to the spent dialysate output for receiving spent dialysate, and wherein the regenerator outlet may be coupled to the fresh dialysate input for dispensing regenerated dialysate.

20 Claims, 16 Drawing Sheets

(51) Int. Cl.
| | |
|---|---|
| A61M 1/26 | (2006.01) |
| B01D 15/16 | (2006.01) |
| B01D 15/18 | (2006.01) |
| B01D 15/36 | (2006.01) |
| B01J 20/20 | (2006.01) |
| B01J 20/28 | (2006.01) |
| B01J 39/02 | (2006.01) |
| B01J 39/10 | (2006.01) |
| B01J 39/12 | (2006.01) |
| B01J 41/02 | (2006.01) |
| B01J 41/10 | (2006.01) |
| B01J 47/018 | (2017.01) |
| B01J 47/024 | (2017.01) |
| B01J 47/026 | (2017.01) |
| B01J 47/12 | (2017.01) |

(52) U.S. Cl.
CPC .......... *A61M 1/1605* (2014.02); *A61M 1/267* (2014.02); *B01D 15/166* (2013.01); *B01D 15/18* (2013.01); *B01D 15/362* (2013.01); *B01D 15/363* (2013.01); *B01J 20/20* (2013.01); *B01J 20/2805* (2013.01); *B01J 39/02* (2013.01); *B01J 39/10* (2013.01); *B01J 39/12* (2013.01); *B01J 41/02* (2013.01); *B01J 41/10* (2013.01); *B01J 47/018* (2017.01); *B01J 47/024* (2013.01); *B01J 47/026* (2013.01); *B01J 47/12* (2013.01); *A61M 2205/3331* (2013.01)

(58) Field of Classification Search
CPC .............. A61M 1/1619; A61M 1/1635; A61M 1/1696; A61M 1/267; A61M 1/287; A61M 2205/3331; B01D 15/166; B01D 15/18; B01D 15/362; B01D 15/363; B01J 20/20; B01J 20/2805; B01J 2220/62; B01J 39/02; B01J 39/10; B01J 39/12; B01J 41/02; B01J 41/10; B01J 47/018; B01J 47/024; B01J 47/026; B01J 47/12
See application file for complete search history.

(56) References Cited

U.S. PATENT DOCUMENTS

| | | |
|---|---|---|
| 2013/0199998 A1 | 8/2013 | Kelly et al. |
| 2013/0213890 A1 | 8/2013 | Kelly et al. |
| 2014/0158588 A1 | 6/2014 | Pudil et al. |
| 2017/0087291 A1 | 3/2017 | Gerber |
| 2020/0078507 A1 | 3/2020 | Bluechel et al. |

FOREIGN PATENT DOCUMENTS

| | | |
|---|---|---|
| WO | WO 2005/123230 A2 | 12/2005 |
| WO | WO 2007/103411 A2 | 9/2007 |
| WO | WO 2009/157877 A1 | 12/2009 |
| WO | WO 2012/067585 A1 | 5/2012 |
| WO | WO 2014/121162 A1 | 8/2014 |

OTHER PUBLICATIONS

International Preliminary Report on Patentability for PCT/SG2021/050209 (IPEA/EP) mailed Mar. 14, 2022 (6 pages).
Medscape Nephrology, *Sorbent Dialysis Systems: An Expert Commentary by Stephen R. Ash, MD, FACP*, Aug. 5, 2008 (10 pages).
International Search Report issued for the corresponding International patent application No. PCT/SG2021/050208, dated Jul. 12, 2021, 2 pages (for informational purposes only).

DIALYSATE REGENERATOR AND SYSTEM COMPRISING THE SAME

CROSS-REFERENCE TO RELATED APPLICATION

This application is a National Stage Application, filed under 35 U.S.C. § 371, of International Application No. PCT/SG2021/050209, filed Apr. 13, 2021, which claims the benefit of priority of Singapore Patent Application No. 10202003361W, filed on 13 Apr. 2020, Singapore Patent Application No. 10202003363P, filed on 13 Apr. 2020, and Singapore Patent Application No. 10202003365X, filed on 13 Apr. 2020, the contents of all of which are hereby incorporated by reference in their entirety for all purposes.

TECHNICAL FIELD

An aspect of the disclosure relates to a dialysate regenerator for connecting to a dialysis apparatus. An aspect of the disclosure relates to a dialysis system including a dialysis apparatus coupled to the dialysate regenerator.

BACKGROUND

Existing dialysis apparatuses utilize fresh dialysate, typically provided in a pouch, and dispose used dialysate in a container that is disposed. Used dialysate is completely disposed, generating waste. Thus, there is a need to provide for an improved dialysis, and improved dialysis system.

SUMMARY

An aspect of the disclosure relates to a dialysate regenerator for connecting to a dialysis apparatus. The dialysate regenerator may include a regenerator inlet for receiving dialysate and a regenerator outlet for dispensing regenerated dialysate. The dialysate regenerator may further include a hydraulic circuit connected between the regenerator inlet and the regenerator outlet. The dialysate regenerator may further include a fluid portioning system to divide a dialysate flow into uniform portions for sequential regeneration. The dialysate regenerator may include purification means, which is configured to convert spent dialysate into regenerated dialysate. For example, the purification means may include a compartment including a toxin remover, for example, an adsorber.

According to various embodiments the sequential regeneration may include two alternate states including a first state and a second state. The fluid portioning system may include: a chamber including a movable separator wall separating the interior of the chamber into a first compartment and a second compartment. The fluid portioning system may include a first opening for allowing exchange of dialysate to and from the first compartment. The fluid portioning system may include a second opening for allowing exchange of dialysate to and from the second compartment. The fluid portioning system may be configured to allow dialysate flow from the regenerator inlet to one of the first and second compartments in the first state and to the other one of the first and second compartments in the second state. A dialysate ingress into the one compartment causes displacement of the movable separator wall and dialysate to egress from the other compartment.

According to various embodiments, the hydraulic circuit may further include a flow adjuster configured to detect an external flow or external pressure from one or each of the regenerator inlet and the regenerator outlet (individually) and adjust an internal flow or internal pressure so that the external flow or external pressure remains unchanged. Thus, for one or each of the regenerator inlet and the regenerator outlet individually, the external flow or the external pressure remains substantially unchanged, for example the pressure remains within a close range to zero, for example within of +/−7 kPa. The flow at the outlet and at the inlet may be different. It is normal that a dialysis apparatus drains fluid faster than it withdraws fresh fluid.

According to various embodiments, the flow adjuster may include a dampener for accommodating temporary changes of internal pressure. The dampener may also serve to accommodate differences of the external flow or pressure at the regenerator inlet and/or outlet.

According to various embodiments, the flow adjuster may include a pressure sensor to detect the external pressure at the one or both of the regenerator inlet and the regenerator outlet. The flow adjuster may be configured to adjust the internal flow or internal pressure based on the external pressure detected by the sensor.

According to some embodiments, the dialysate regenerator, further including a housing, wherein the housing may include a base and a counter portion which may be releasable attachable to each other. The base may be a cradle. The chamber of the fluid portioning system may include a base part and a counter part, the base part included by the base of the housing. The base part and the counter part of the chamber may be attached together when the counter portion and the base are attached to each other. According to various embodiments, the counter part of the chamber may be a replaceable cartridge. The cartridge may be disposable.

According to some embodiments, the movable separator wall may be attached to the counter part of the chamber so that it may be retained in the counter portion of the housing when the counter portion is released from the base of the housing. According to some embodiments, the movable separator wall may be attached to the cartridge so that it may be retained in the cartridge when the cartridge is removed from the base of the housing.

According to some embodiments, as an alternative to the fluid portioning system being separated into a base and a counter portion of the housing, the fluid portioning system may be included in the counter portion of the housing, thus, the fluid portioning system is replaced when the counter portion is replaced.

According to various embodiments the separator wall may be a membrane. According to various embodiments the membrane may be pre-shaped, for example, having a convex side. The membrane may be flipable between a first membrane side being convex in the first state and a second side being convex in the second state.

According to some embodiments, the first compartment may include a first bag fluidly connected to the first opening. The separator wall may be a wall of the first bag.

According to some embodiments, the second compartment may include a second bag fluidly connected to the second opening. The separator wall may be a wall of the second bag.

According to some embodiments, the first compartment may include a first bag fluidly connected to the first opening, the second compartment may include a second bag fluidly connected to the second opening, and the wall of the first bag and the wall of the second bag contact each other and form the separator wall.

According to various embodiments, the flow adjuster may include a pump to increase pressure. According to various embodiments, the pump may be a bellows pump, a piston pump, a gear pump, a rotary vane pump, a roller pump, or a peristaltic pump. In a roller pump, the pump tubing, and optionally also the pump profile may be part of the cartridge, while the pump roller and motor are part of the base. Disposable and non-disposable components may engage using a suitable lever and lock mechanism to ensure adequate mechanical stability.

According to various embodiments, the pump may include two pump chambers that may be configured to alternately allow inflow of dialysate and to pump the dialysate out through an opening of a corresponding pump chamber. For example, the pump may be a bellows pump.

According to some embodiments, the pump may be controlled by a filling status of the pump chamber being filled. For example, the pump may include one or more chamber filling, sensors, which detect that the pump chamber, which is currently being filled with dialysate, is filled to a pre-determined volume (for example completely filled). When the pre-determined volume is achieved, the pump chamber is switched to empting mode, e.g., by switching valves. The one or more chamber filling sensors may be pressure sensors. The flow adjuster may be configured so that the pump chamber that is being emptied is always empty before or at the same time that the pump chamber being filled is completely filled, this may be achieved, e.g., by adjusting a pressure used for emptying the chamber.

According to various embodiments, the pump may be pneumatic i.e., pneumatically driven. To pump the dialysate may include applying pneumatic pressure on a side of a moveable pump wall that is opposite to a dialysate contacting side, on the corresponding pump chamber.

According to various embodiments the pump may be connected to the housing. The housing may include a base and a counter portion which may be releasably attachable to each other.

According to various embodiments, one of the two pump chambers may be divided into two chambers connected in parallel to a pneumatic pressure receiving side. The two chambers may be disposed on opposite sides of the other one of the two pump chambers, so that tension applied to the housing during pumping by one of the two pump chambers may be symmetrically distributed to the other one of the two pump chambers.

According to various embodiments, the pneumatic pressure receiving side of the one of the two pump chambers and a further pneumatic pressure receiving side of the other one of the two pump chambers may be disposed on the base, for example, be included by the base.

According to various embodiments the base may be reusable and may include control elements and the counter portion may include disposable elements.

According to various embodiments, the base may be reusable. The counter portion of the housing may include a replaceable cartridge.

According to various embodiments, the base may be reusable. The counter portion of the housing may include the replaceable cartridge.

According to various embodiments, the dialysate regenerator may further include a purification means.

According to various embodiments, the dialysate regenerator may further include a regeneration compartment comprising the purification means.

According to various embodiments, the purification means may include one or both of an adsorption filter or a sorbent cartridge.

According to various embodiments, the hydraulic circuit may further include an infusate input and is configured to add a predetermined volume of infusate to the dialysate.

According to various embodiments, the hydraulic circuit may further include a sorbent cartridge. The hydraulic circuit may further include at least one reversible retainer including an ion reservoir. A direction of the dialysate flow through the reversible retainer may be reversible.

According to various embodiments, the dialysate regenerator may include an additive doser (e.g., infusate doser) which allows for mixing an additive (e.g. infusate) into the dialysate. The additive doser may include its own portioning system (additive portioning system), which may be synchronized with the fluid portioning system that portions the dialysate, so that a ratio of additive to dialysate is kept constant according to a pre-determined ratio. In some embodiments, additive dosing is sequential and provided by an additive portioning system (or infusate portioning system) which may include: an additive portioning chamber including a movable separator wall separating the interior of the additive portioning chamber into a first additive portioning compartment and a second additive portioning compartment. The additive portioning system may include a first opening for allowing exchange of additive to and from the first additive portioning compartment. The fluid portioning system may include a second opening for allowing exchange of additive to and from the second additive portioning compartment. The additive portioning system may he configured to allow additive flow from an additive input or reservoir to one of the first and second additive portioning compartments in the first state and to the other one of the first and second additive portioning compartments in the second state. An additive ingress into the one additive portioning compartment causes displacement of the movable separator wall and additive to egress from the other additive portioning compartment. A valve system may be implemented to regulate the flow and the mixture of the additive with the dialysate. Alternatively, the additive portioning system may also comprise only one additive portioning compartment, which may be pneumatically actuated.

An aspect of the disclosure relates to a dialysis system including a dialysis apparatus and the dialysate regenerator in accordance with various embodiments. The dialysis apparatus may include a fresh dialysate input and a spent dialysate output. The regenerator inlet of the dialysate regenerator may be coupled to the spent dialysate output for receiving spent dialysate. The regenerator outlet of the dialysate regenerator may be coupled to the fresh dialysate input for dispensing regenerated dialysate.

BRIEF DESCRIPTION OF THE DRAWINGS

The invention will be better understood with reference to the detailed description when considered in conjunction with the non-limiting examples and the accompanying drawings, in which:

In FIG. 5B the counter portion 210 is attached to the base 220;

In FIG. 6B the counter portion 210 is attached to the base 220 and the housing 200 is closed;

FIGS. 12A and 12B show an exemplary chamber 121 of the fluid portioning system 120. Wherein FIG. 12A shows the chamber 121 in assembled state and FIG. 12B shows the exemplary chamber in exploded view;

DETAILED DESCRIPTION

Figure 1:
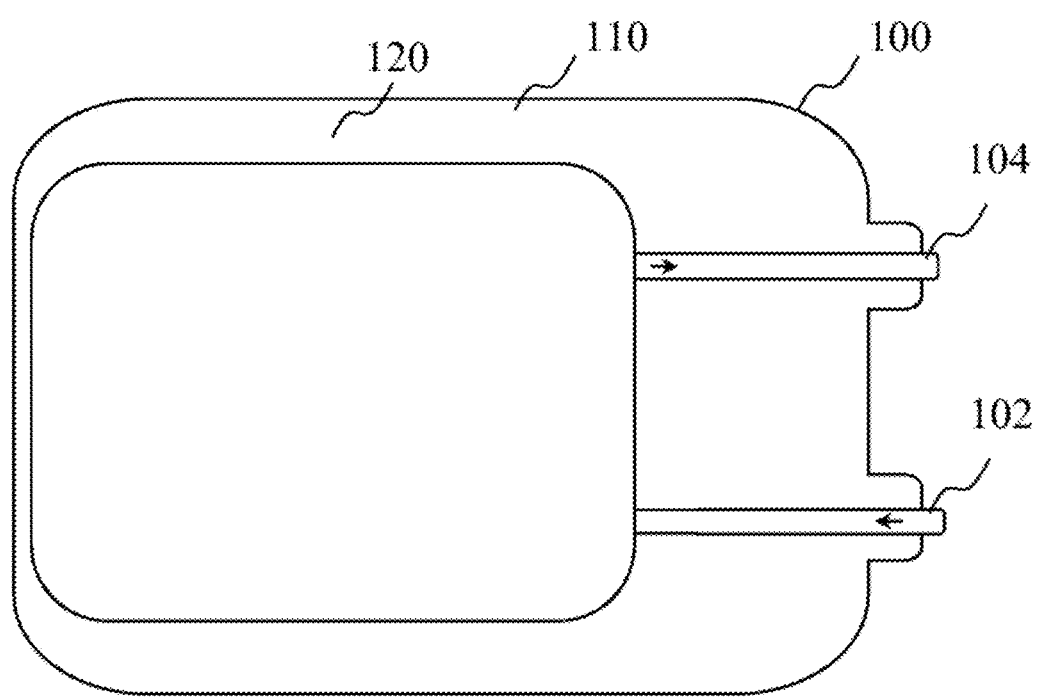
FIG. 1 shows a schematic of the dialysate regenerator 100.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of a system are analogously valid for a regenerator, and vice-versa.

Features that are described in the context of an embodiment may correspondingly be applicable to the same or similar features in the other embodiments. Features that are described in the context of an embodiment may correspondingly be applicable to the other embodiments, even it not explicitly described in these other embodiments. Furthermore, additions and/or combinations and/or alternatives as described. for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, references a "base" (or "base part") may mean a part that cooperates to attach to the counter portion (or counter part) and is not necessarily limiting in position or direction in relation to ground. For example, in some embodiments, base may be positioned lower than the counter portion, and in other embodiments, the base may be positioned higher or at a same level as the counter portion. The base may be a cradle.

As used herein, the term "and/or" includes any and all combinations of one or more of the associated listed items.

The dialysate entering the regenerator input may be termed 'spent dialysate' and may refer to a dialysate that contains one or more toxins, or waste species, or waste substance, such as urea. It is generally understood that it is intended to remove such one or more toxins, or waste species, or waste substance, such as urea from the spent dialysate. The spent dialysate may also contain one or more electrolytes or ions. The dialysate dispensed at the regenerator outlet may be termed 'fresh dialysate' (or regenerated dialysate) and may refer to a dialysate that is substantially free of one or more toxins, or waste species, or waste substance, such as urea. The fresh dialysate may also contain a desired concentration of one or more electrolytes or ions.

Dialysate regeneration may include removing unwanted contaminants or patient waste products from spent dialysate. Dialysate regeneration requires accurate determination of volumes or volume ratios of fluids used for regeneration. For example, accurate dosing of infusate to purified dialysate after sorbent purification on sorbent system, or accurate portioning for regeneration in electrolyte retaining sorbents. A comparative stand-alone system would further need to be able to passively control regeneration flow rate in response to external flow requirements. Further, a comparative stand-alone system would need to have particular safety functions specific to implemented regeneration method. For example, sensing means to detect potentially un-safe chemical composition of regenerated dialysate. In contrast to the comparative stand-alone system, a dialysate regenerator according to various embodiments may include one or more, such as all of: fluid portioning means, infusate dispensing means, purification means (e.g., toxin removal means), flow adjustment means, sensing means, and electronic control means, which need not be integrated in an existing dialysis apparatus.

As used herein, and in accordance with various embodiments, the term 'dialysis' may refer to hemodialysis (HD), hemofiltration, hemodiafiltration, plasmapheresis, peritoneal dialysis (PD), liver dialysis, lung dialysis, water purification, regeneration of physiological fluids, or regeneration of biological fluids. The dialysis may be a sorbent-based regenerative dialysis. Similarly a dialysate regenerator may refer to a dialysate regenerator for hemodialysis dialysate, a dialysate regenerator for peritoneal dialysis dialysate, a dialysate regenerator for liver dialysis dialysate, a dialysate regenerator for king dialysis dialysate, regeneration of water purification hydrolytes, a dialysate regenerator for regeneration of hemofiltrate, a dialysate regenerator for regeneration of plasma, a dialysate regenerator for regeneration of physiological fluids, or a dialysate regenerator for regeneration of biological fluids.

Various embodiments disclosure a dialysate regenerator 100 for connecting to a dialysis apparatus. FIG. 1 discloses a schematic of the dialysate regenerator 100 which is used for illustration purposes, and is otherwise not limiting. The dialysate regenerator 100 may include a regenerator inlet 102 for receiving dialysate and may further include a regenerator outlet 104 for dispensing regenerated dialysate. The dialysate regenerator 100 may include a hydraulic circuit 110 connected between the regenerator inlet 102 and the regenerator outlet 104. The dialysate regenerator 100 may further include a fluid portioning system 120 to divide a dialysate flow into uniform portions for sequential regeneration.

According to various embodiments, the dialysate regenerator 100 may include the purification means 123, which is configured to convert spent dialysate into regenerated dialysate. For example, the purification means may include a compartment including a toxin remover, for example, an adsorber.

Figure 2:
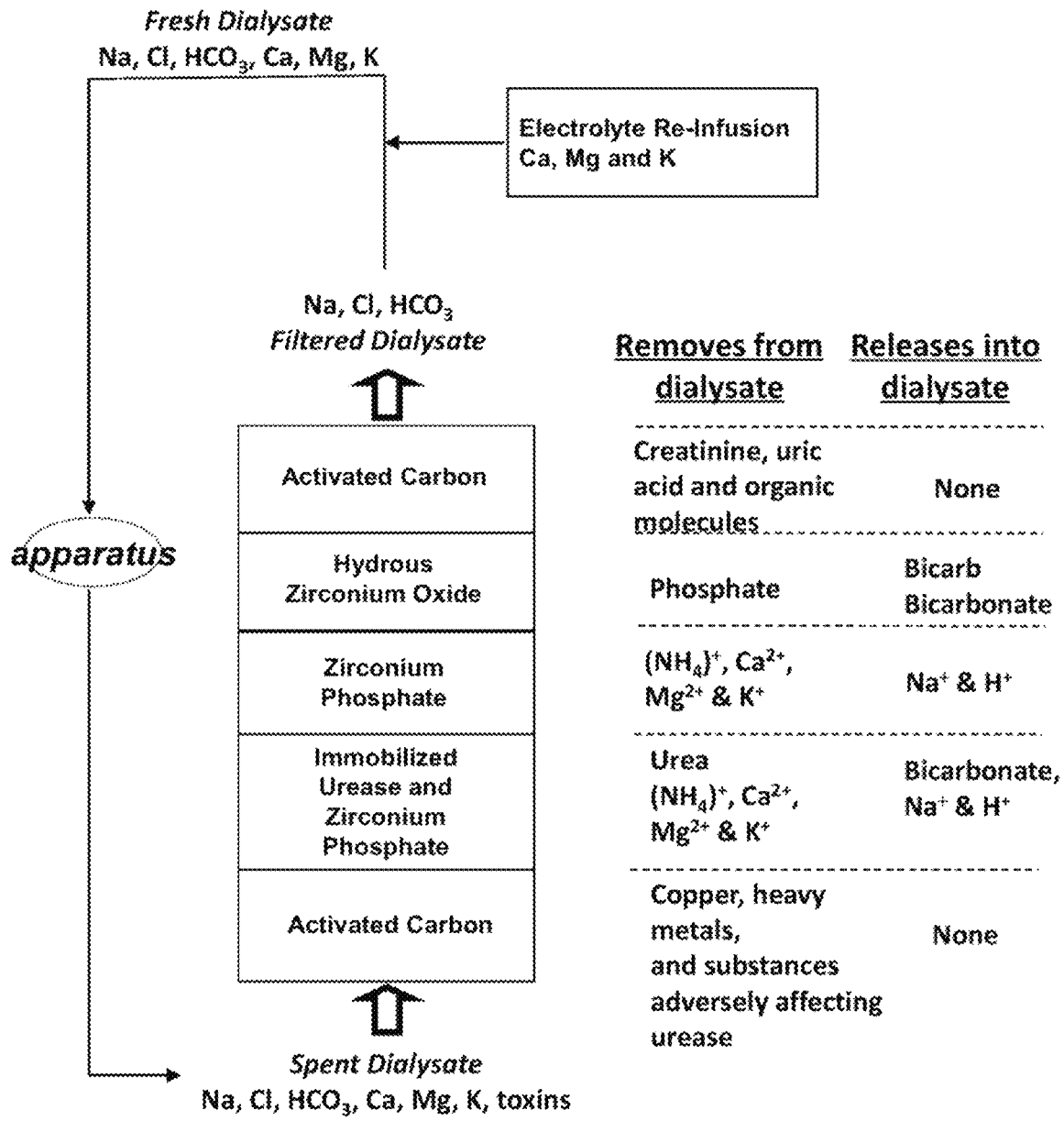
FIG. 2 shows a schematic of regeneration using adsorber and several optional sorbent systems.

The adsorbent system relies on directly contacting spent dialysate with a series of adsorber materials (see FIG. 2). Those can be classified as follows:

Activated Carbon: This sorbent removes organic uremic metabolites from spent dialysate, e.g., creatinine, uric acid and some middle molecules such as β2 microglobulin.

Anion Exchanger: Our sorbent system contains hydrous zirconium oxide (HZO) as an inorganic anion exchanger adsorbing negatively charged anions such as phosphate and sulfide in exchange for hydroxide.

Urea adsorber: Due to the low reactivity and specificity of urea, the sorbent system has to resort to a combination of enzyme (urease) catalyzed hydrolysis of urea, and subsequent adsorption of the hydrolysis product, ammonia, on a non-selective cation exchanger. This cation exchanger is zirconium phosphate (ZP), exchanging ammonium ions primarily for hydrogen ions. Zirconium Phosphate, however, also adsorbs other cations, most notably calcium, magnesium and potassium, primarily in exchange for sodium. This inadvertent electrolyte removal consumes cation exchange capacity (and thereby urea adsorption capacity) and impacts dialysate sodium concentration and acidity. An additional element for the dialysate reconstitution process, which is electrolyte re-infusion may be needed. Electrolyte re-infusion requires a controlled pumping system adding electrolytes to the regenerated dialysate in order to re-establish the physiologically required electrolyte concentrations. To this end, a solution of calcium, magnesium and/or potassium ions must typically be infused into the regenerated dialysate. The dispensed solution has to be prepared by the patient before treatment, or is provided in sterilised pre-packed form.

According to various embodiments, the dialysate regenerator 100 may include a sensor for detecting whether the regenerated dialysate is within predefined parameters. For example, the dialysate regenerator 100 may include an electronic ammonia sensor, configured to detect a level of ammonia in the regenerated dialysate. In case the regenerator controller detects an error condition, such as e.g. the presence of excessive amounts of ammonia in regenerated dialysate, the regenerator may stop its operation, for example by simply stopping the pump, thereby provoking a pressure alarm in the connected dialysis machine.

According to various embodiments, the dialysate regenerator 100 may include a hydrophobic gas vent, where larger gas inclusions (if present) are vented. This gas vent may also serve as an interface connecting to the sensor, e.g. the electronic ammonia sensor, which may be located in the base.

Figure 3A:
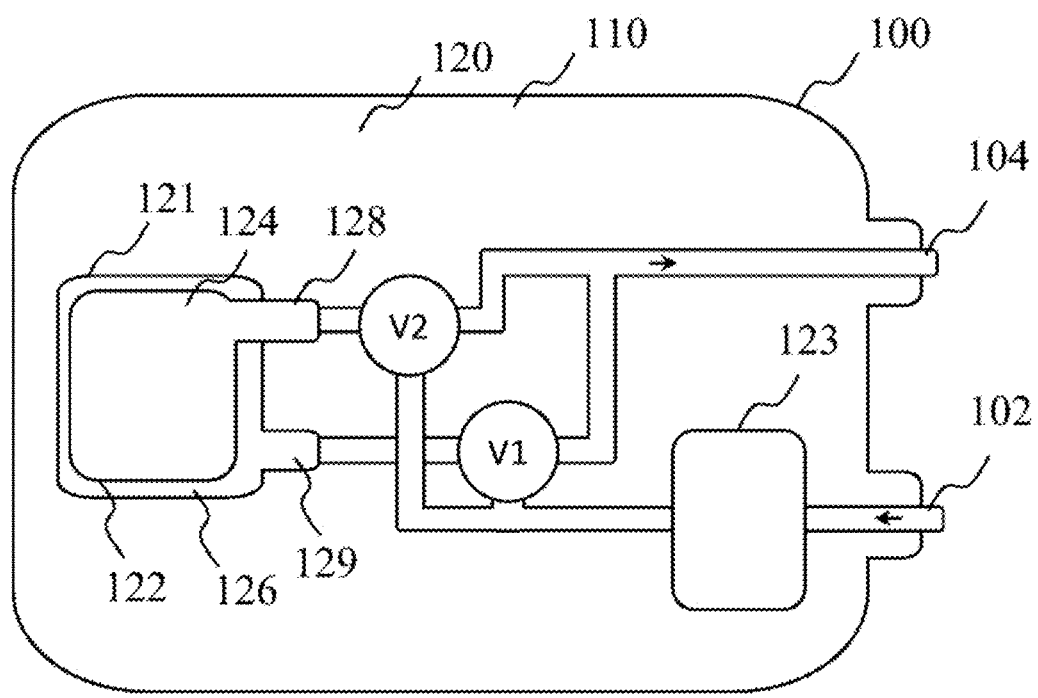
FIG. 3A shows a schematic of the dialysate regenerator 100 including more details of the fluid portioning system.

According to various embodiments, the sequential regeneration may include two alternate states ST1, ST2 including a first state ST1 and a second state ST2. FIG. 3A discloses a schematic of the dialysate regenerator 100 including more details of the fluid portioning system, which is used for illustration purposes, and is otherwise not limiting. The fluid portioning system 120 may include a chamber 121. The chamber 121 may include a movable separator wall 122 separating the interior of the chamber 121 into a first compartment 124 and a second compartment 126. The chamber 121 may further include a first opening 128 for allowing exchange of dialysate to and from the first compartment 124. The chamber 121 may further include a second opening 129 for allowing exchange of dialysate to and from the second compartment 126. The fluid portioning system 120 may be configured to allow dialysate flow from the regenerator inlet 102 to one of the first and second compartments 124, 126 in the first state ST1, and to the other one of the first and second compartments 126, 124 in the second state ST2, wherein dialysate ingress into the one compartment 124, 126 cause displacement of the movable separator wall 122 and dialysate to egress from the other compartment 126, 124. For example, valves V1 and V2 may be controlled such that, during the first state ST1, valve V2 allows dialysate to flow into the first compartment 124, and valve V1 allows dialysate to flow out of the second compartment 126. In the example, valves V1 and V2 may be controlled such that, during the second state ST2, valve V1 allows dialysate to flow into the second compartment 126, and valve V2 allows dialysate to flow out of the first compartment 124. In FIG. 3A valve V2 connects the regenerator inlet 102 to the first compartment 124 during the first state ST1, and does not connect the regenerator outlet 104 to the first compartment 124 during the first state ST1, further, valve V1 connects the regenerator inlet 102 to the second compartment 126 during the second state ST2, and does not connect the regenerator outlet 104 to the second compartment 124 during the second state ST2. However, the illustration of FIG. 3A is non-limiting and other elements may be implemented in further developments as describe herein.

Figure 3B:
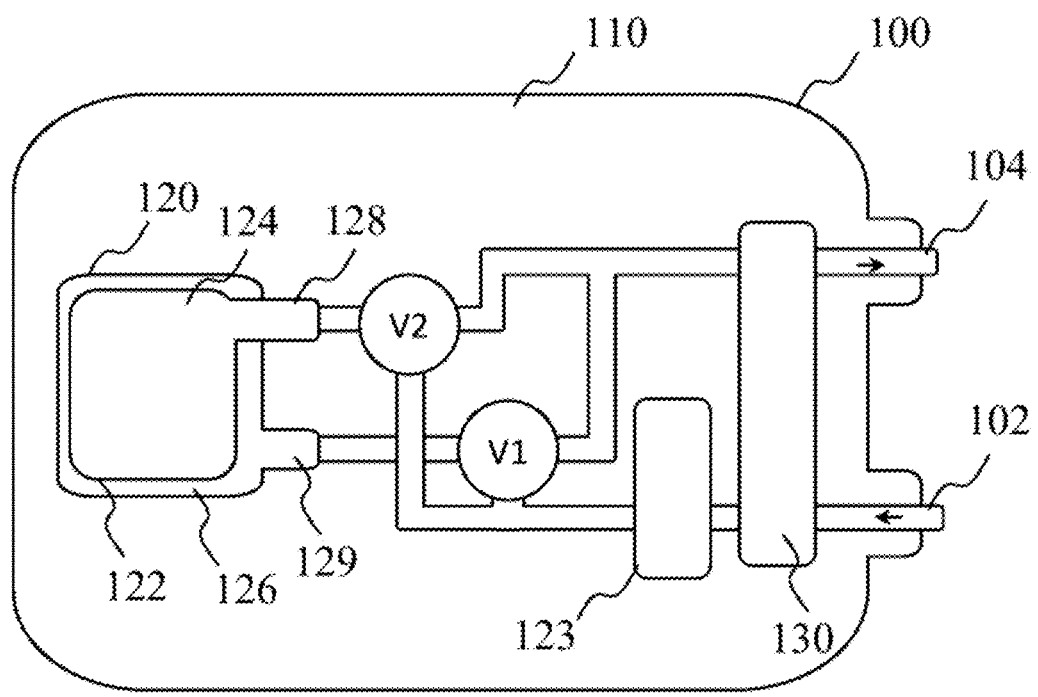
FIG. 3B illustrates an example of a flow adjuster 130, as a hydraulic circuit comprising hydraulic components connected between the fluid portioning system 120 and one or both of the regenerator inlet 102 and the regenerator outlet 104.

According to various embodiments, the hydraulic circuit 110 may further include: a flow adjuster 130 configured to detect an external flow or external pressure from one or both of the regenerator inlet 102 and the regenerator outlet 104 and adjust an internal flow or internal pressure so that the external flow remains unchanged. For example, the external pressure remains within a close range to zero, for example within of +/−7 kPa. An external pressure from the regenerator inlet 102 means a pressure measured in proximity to the regenerator inlet 102. An external pressure from the regenerator outlet 104 means a pressure measured proximity to the regenerator outlet 104. FIG. 3B illustrates an example of a flow adjuster 130, as a hydraulic circuit comprising hydraulic components connected between the fluid portioning system 120 and one or both of the regenerator inlet 102 and the regenerator outlet 104. Dampener 134' may include a pressure sensor for measuring the external pressure PS1 from the regenerator inlet 102. Dampener 134" may include a pressure sensor for measuring the external pressure PS2 from the regenerator outlet 104.

As used herein, and in accordance with various embodiments, the term "external" may be a reference to the regenerator inlet or at the regenerator outlet and adjacent tubing. For example, the external pressure from the regenerator inlet may be measured at a tubing of which the end forms or is connected to an inlet port. For example, the external pressure from the regenerator outlet may be measured at a tubing of which the end forms or is connected to an outlet port.

According to various embodiments, purification means 123 may be connected in series with the flow adjuster.

According to various embodiments, the flow adjuster 130 may include a dampener 134' and/or 134" for accommodating temporary changes of internal pressure, external pressure, temporary differences of external flow at the regenerator inlet, temporary differences of external flow at the regenerator outlet, or a combination thereof.

According to various embodiments, the flow adjuster 130 may further include electronic control means to regulate the flow, e.g., via regulating a pump speed, in response to the supply or demand by a connected dialysis apparatus. This regulation may e.g., be achieved with a closed-loop regulation with pressure sensors at the regenerator inlet or the regenerator outlet of the dialysate regeneration device, or with level detectors in regenerator inlet or regenerator outlet reservoir volumes.

Figure 4A:
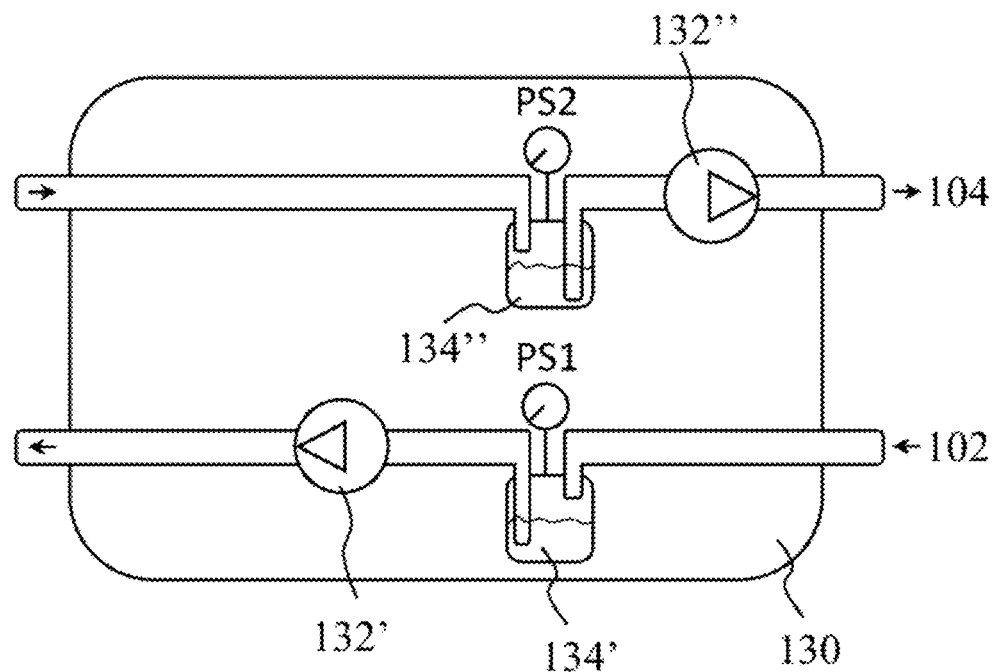
FIGS. 4A to 4C show flow adjusters 130 including hydraulic elements for adjusting pressure and/or flow.

FIG. 4A shows a flow adjuster 130 including hydraulic elements for adjusting pressure and/or flow. The flow adjuster 130 may include more or less elements than shown, for example, the flow adjuster 130 according to various embodiments, may have only one pump 132' or 132", or two pumps. FIG. 4A shows that, connected to the regenerator inlet 102, the flow adjuster 130 may include a dampener 134' and a first pressure sensor PS1, and a first pump 132' connected in series with the dampener. FIG. 4A further shows that, connected to the regenerator outlet 104, the flow adjuster 130 may include a dampener 134" and a second pressure sensor PS2, and a second pump 132" connected in series with the dampener. The first pump 132' may be started when the pressure measured by the first pressure sensor PS1 is below a first threshold, and stopped when the pressure is over that threshold. The controlling of the first pump may be electronically, electric, pneumatic, or a combination thereof. Alternatively or in addition the second pump 132" may be started when the pressure measured by the second pressure sensor PS2 is below a second threshold, and stopped when the pressure is over that threshold. The controlling of the second pump may be electronically, electric, pneumatic, or a combination thereof. In another variation only one pump is used (for example either 132' or 132") and the pump is controlled according to the pressure measured by the first pressure sensor PS1, the pressure measured by the second pressure sensor PS2, a filling level of the dampener 134', a filling level of the dampener dampener 134", according to a state depending on the first pressure and of the second pressure, according to a state depending on the filling level of the dampener 134' and the dampener 134". The flow adjuster 130 may include a reservoir connected to the regenerator inlet 102 (not shown in FIG. 4A).

Figure 4B:
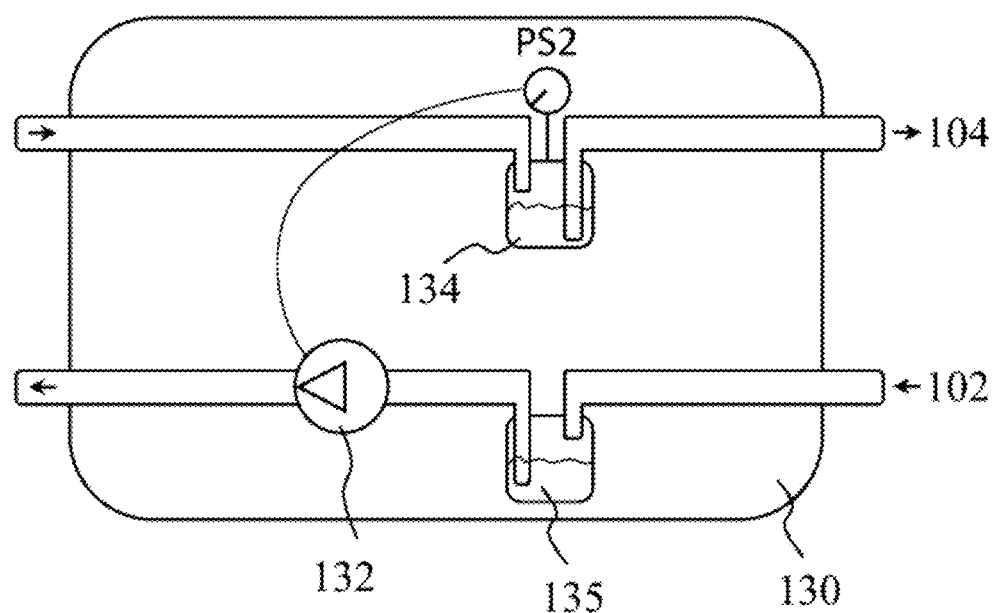

FIG. 4B shows another flow adjuster 130 including hydraulic elements for adjusting pressure and/or flow. The flow adjuster 130 may include more or less elements than shown. The flow adjuster 130 may include a reservoir 135 connected to the regenerator inlet 102. The reservoir may ensure that a pressure of the regenerator inlet 102 is essentially zero, thus the inlet 102 is connectable a drain of a dialysis apparatus without any further modification. The reservoir 135 may also accommodate excess of dialysate, and may have a capacity (in volume) of up to 5 L. The flow adjuster 130 may include a pump 132. FIG. 4B shows that, connected to the regenerator outlet 104, the flow adjuster 130 may include a dampener 134 and a pressure sensor PS2. The pump 132 may be started when the pressure measured by the pressure sensor PS2 is below a first threshold (e.g., below 7 kPa), and stopped when the pressure is over that threshold. The controlling of the first pump may be electronically, electric, pneumatic, or a combination thereof.

Figure 4C:
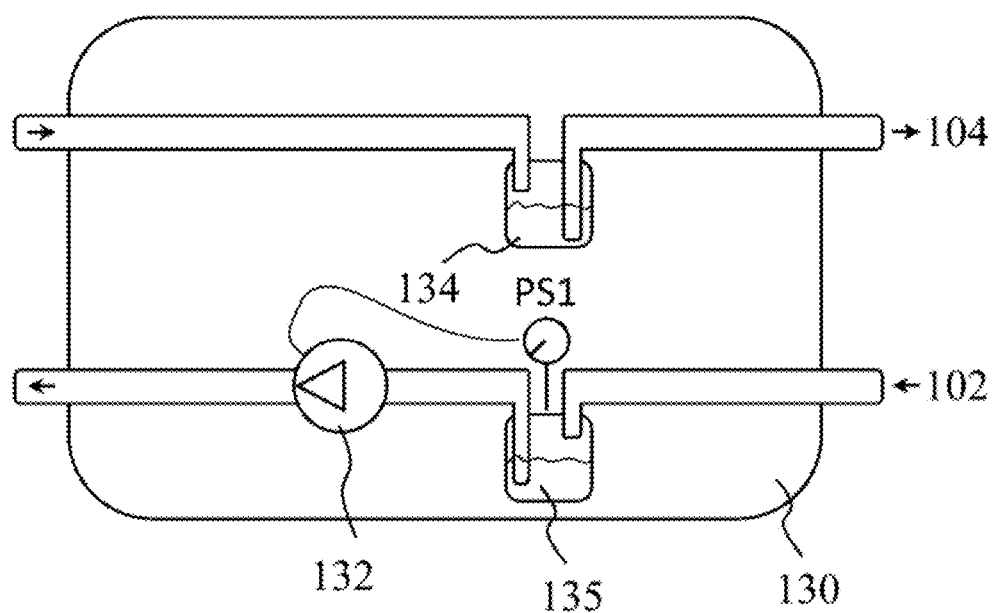

The flow adjuster 130 may alternatively include a reservoir 134 connected to the regenerator outlet 104. The reservoir may ensure that a pressure of the regenerator outlet 104 is essentially zero, thus the outlet 104 is connectable to the inlet of a dialysis apparatus without any further modification. The reservoir 134 may also accommodate excess of dialysate, and may have a capacity (in volume) of up to 5 L. The flow adjuster 130 may include a pump 132. FIG. 4C shows that, connected to the regenerator inlet 102, the flow adjuster 130 may include a dampener 135 and a pressure sensor PS1. The pump 132 may be started when the pressure measured by the pressure sensor PS1 is above a first threshold (e.g., above 7 kPa), and stopped when the pressure is below that threshold. The controlling of the first pump may be electronically, electric, pneumatic, or a combination thereof.

According to various embodiments the flow adjuster 130 may include a pressure sensor 136 to detect the external pressure at the one or both of the regenerator inlet 102 and the regenerator outlet 104, for example the pressure sensor 136 may include the pressure sensor PS1 and/or the pressure sensor PS2 illustrated in FIG. 3B. The flow adjuster 130 may be configured to adjust the internal flow or internal pressure based on the external pressure detected by the sensor 136. Thereby, a dialysis apparatus connected to the regenerator inlet 102 and the regenerator outlet 104 sees flow impedances identical as in a comparative example wherein the dialysis apparatus is used with a dialysate dampener and a dialysate drain, thus within the normal operating parameters of the dialysis apparatus.

FIGS. 5A, 5B, 6A, and 6B show different exemplary embodiments of housings 200 in accordance with various embodiments.

According to various embodiments, the dialysate regenerator 100 may further include a housing 200. The housing 200 may include a base 220 and a counter portion 210 which may be releasably attachable to each other. The counter portion 210 may include a cartridge, that is attachable to the base. Alternatively or in addition, the housing 200 may include a lid 221, for example a hinged lid of which a hinged side is attached to the base and a side opposite to the hinged side is removably lockable to the base 220. For example, the counter portion 210 may include a cartridge which is held in place when the lid 221 is closed.

According to some embodiments, the chamber 121 of the fluid portioning system 120 may include a reusable portion that is part of the base 220 and a replaceable portion that is part of the counter portion 210, for example, part of the cartridge. The reusable portion may be a pneumatic portion which parts do not contact the dialysate. The replaceable portion may be a hydraulic portion that contacts liquids such as the dialysate, and may be replaced, e.g., after one time use, after a pre-determined number of uses, after at predetermined time before first use, after a certain criterium is met, after a filter is full, after a infusate reservoir is empty, or a combination thereof. According to some embodiments, as an alternative to the fluid portioning system being separated into a base and a counter portion of the housing, the fluid portioning system may be included in the counter portion of the housing, thus, the fluid portioning system is replaced when the counter portion is replaced.

Figure 5A:
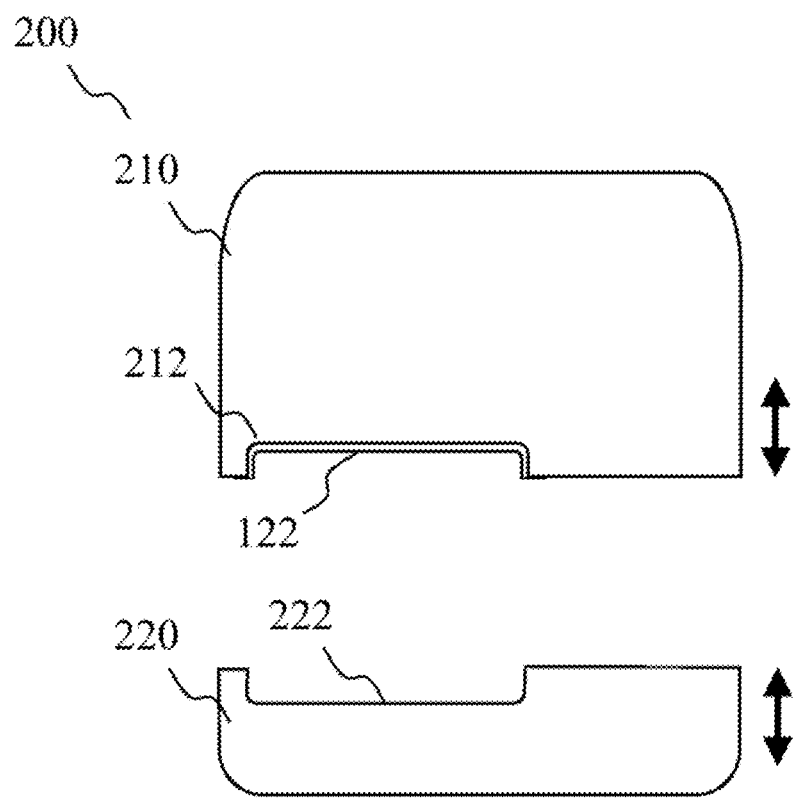
FIGS. 5A and 5B show an example, wherein the counter portion 210 of the housing has the format of a cartridge that is attachable to the base 220.
Figure 5B:
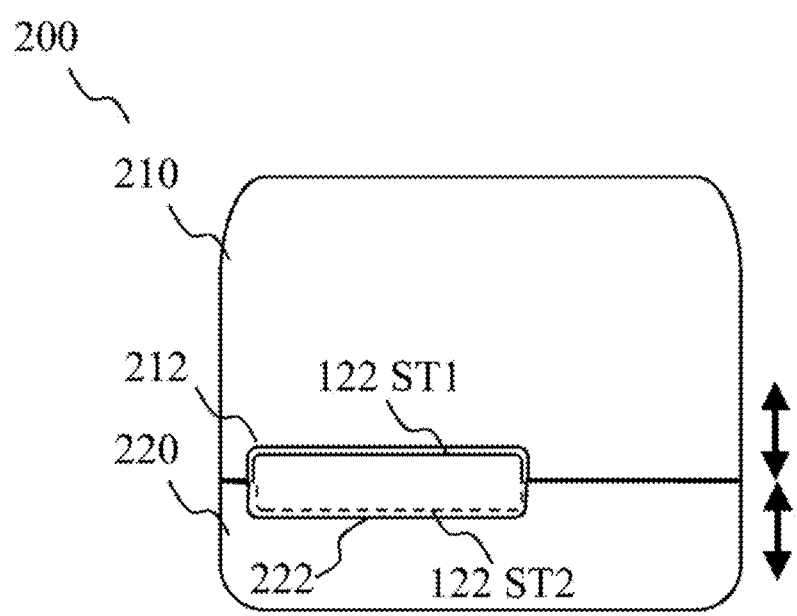

FIGS. 5A and 5B show an example, wherein the counter portion 210 of the housing has the format of a cartridge that is attachable to the base 220. In FIG. 5B the counter portion 210 is attached to the base 220. As illustrated in the FIGS.

5A and 5B, the chamber 121 of the fluid portioning system 120 may include a counter part 212, included in the counter portion 210 and a base part 222, the base part being included in the base 220 of the housing 200. The counter part 212 and the base part 222 of the chamber 121 may be attached together when the counter portion 210 and the base 220 are attached to each other as shown in FIG. 5B. As can be seen in FIG. 5A the separator wall 122, or a layer thereof, may be disposed, e.g. attached, on the counter part 212 of the chamber, thereby being replaceable together with the counter portion 210. FIG. 5B shows the separator wall 122 in two positions, for the first state ST1 and the second state ST2 of which it may alternate.

Figure 6A:
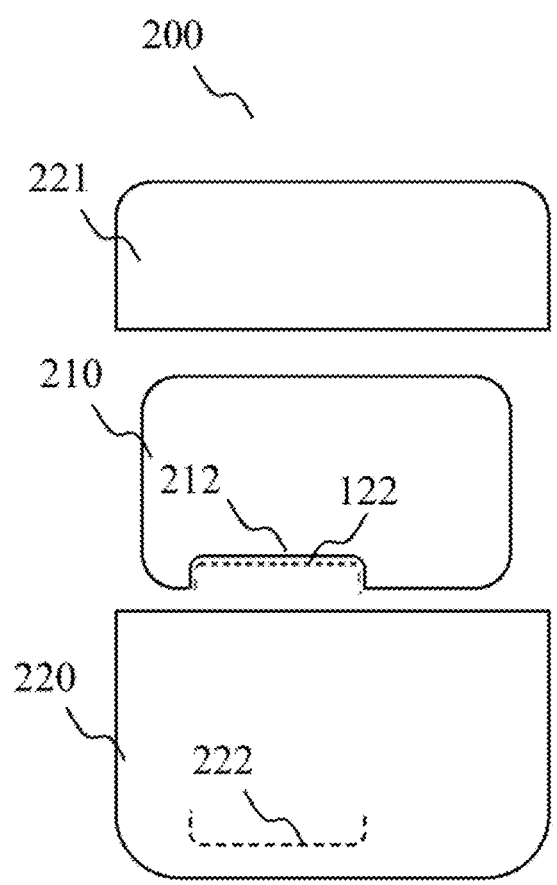
FIGS. 6A and 6B show an example, wherein the counter portion 210 of the housing includes a cartridge that is attachable to the base 220.
Figure 6B:
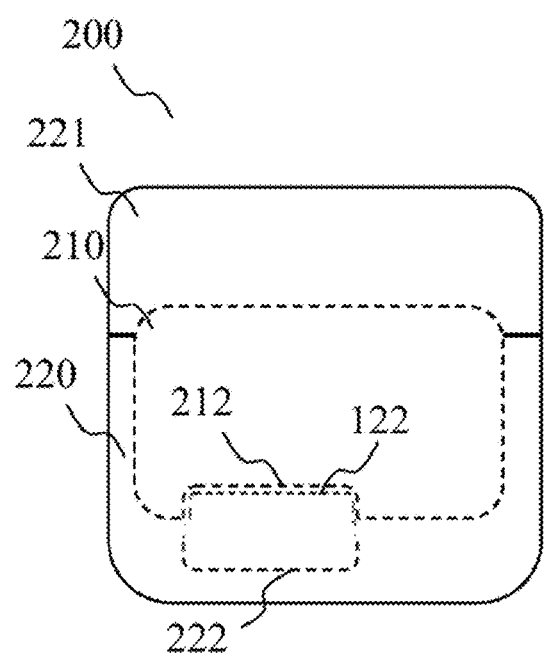

FIGS. 6A and 6B show an example, wherein the counter portion 210 of the housing includes a cartridge that is attachable to the base 220. The cartridge may be secured to the base when the cover 221 is locked to the base, e.g., when the lid is closed. In FIG. 6B the counter portion 210 is attached to the base 220 and the housing 200 is closed. The cover 221 may be a lid, the lid may be hinged on the base on one side and loci able to the base on an opposite side. As illustrated in the FIGS. 6A and 6B, the chamber 121 of the fluid portioning system 120 may include a counter part 212, included in the cartridge. The chamber 121 of the fluid portioning system 120 may further include a base part 222, the base part 222 being included in the base 220 of the housing 200. The counter part 212 and the base part 222 of the chamber 121 may be attached together and secured together when the housing is closed as shown in FIG. 6B. As can be seen in FIG. 6A the separator wall 122, or a layer thereof, may be disposed, e.g. attached, on the counter part 212 of the chamber, thereby being replaceable together with the cartridge.

As previously explained, and in accordance with some embodiments, as an alternative to the fluid portioning system being separated into a base and a counter portion of the housing, the fluid portioning system may be included in the counter portion of the housing, thus, the fluid portioning system is replaced when the counter portion is replaced.

According to various embodiments the separator wall 122 may be a membrane. According to various embodiments, the membrane may be pre-shaped and may be flipable between a first membrane side being convex in the first state ST1 and a second side being convex in the second state ST2. Since the separator wall is a membrane, the side that is not convex in one of the states is concave.

According to various embodiments the counter part 212 of the chamber 121 may be included in a replaceable cartridge and the base 220 may be reusable.

According to various embodiments the movable separator wall 122, or a layer thereof, may be attached to the counter part 212 of the chamber 121 so that it may be retained in the counter portion 210 of the housing 200 or by the cartridge when the counter portion 210 or the cartridge is released from the base 220 of the housing 200.

Figure 7A:
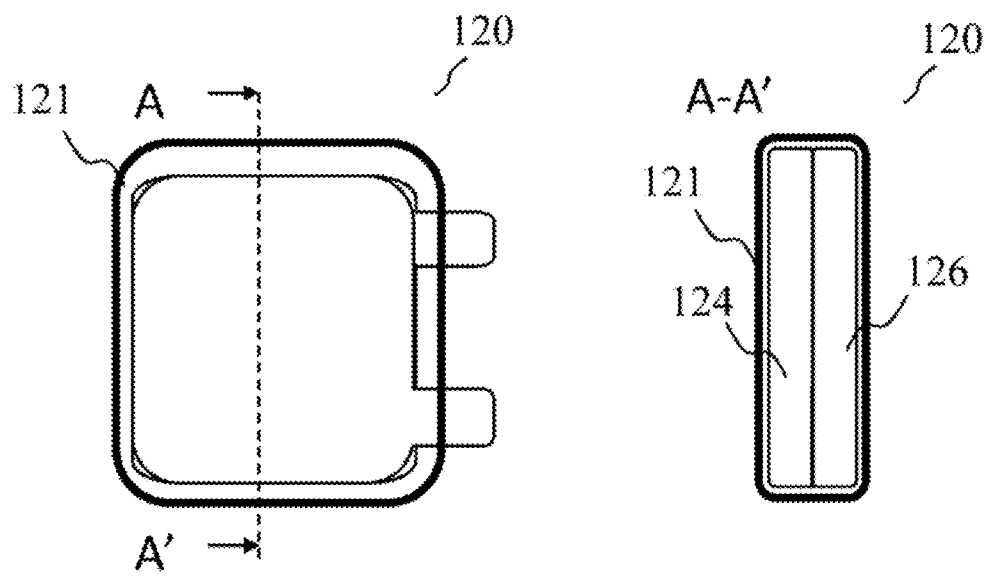
FIG. 7A illustrates the fluid portioning system 120 including 2 compartments 124 and 126 as can be seen in the cross sectional view A-A' in a resting position.

FIG. 7A illustrates the fluid portioning system 120 including 2 compartments, a first compartment 124 and second compartment 126, as can be seen in the cross sectional view A-A' in a resting position. The two compartments may be formed by two bags, each bag connected to one of the to the first and second openings 128, 129. Each of the two bags may be flexible so that its volume can be changed while the total volume of the two compartments remains constant. The fluid portioning system 120 may include an outer casing 121 which may be rigid, thereby limiting the total volume of the two compartments. A maximum volume of a compartments is achieved when the other compartments has a minimum volume (i.e., is completely empty). According to some embodiments, the two bags may be individual and separated bags, that may or may not have been joined, e.g. by welding them together. Alternatively, the two bags may be formed by welding 3 sheets together, so that the first bag is formed between a first sheet and a second sheet (middle sheet) and a second bag is formed between the second sheet and a third sheet. Thereby, the separator wall 122 is formed by the second sheet.

Figure 7B:
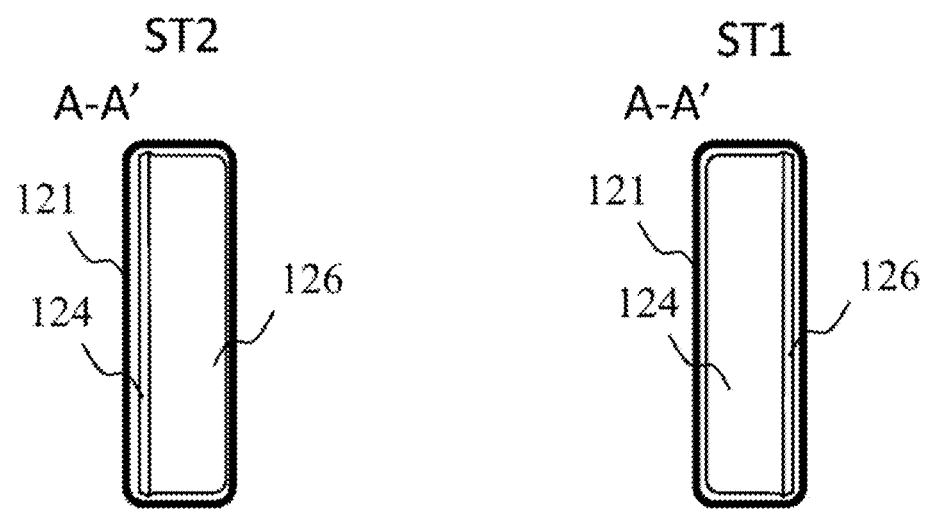
FIG. 7B shows the cross section A-A' of FIG. 7A at the end of two states.

FIG. 7B shows the cross section A-A' at the end of two states, in the second state ST2, the second compartment 126 is full and essentially occupies all the volume of the fluid portioning system 120 and the first compartment 124 is empty and has substantially zero volume. In the first state ST1, the first compartment 124 is full and essentially occupies all the volume of the fluid portioning system 120 and the second compartment 126 is empty and has substantially zero volume.

According to various embodiments, the first compartment may include a first bag fluidly connected to the first opening 128 and wherein the separator wall 122 may be a wall of the first bag. At least a portion of the separator wall, for example only the first bag, may be included in the counter portion 210 of the housing 200 or cartridge.

According to various embodiments, the second compartment may include a second bag fluidly connected to the second opening 129 and wherein the separator wall 122 may be a wall of the second bag, or a combination of the above, in which the wall of the first bag and the wall of the second bag contact each other and form the separator wall 122. At least a portion of the separator wall, for example the second bag, may be included in the counter portion 210 of the housing 200 or cartridge.

According to various embodiments, the first compartment may include a first bag fluidly connected to the first opening 128 and the second compartment may include a second bag fluidly connected to the second opening 129 and the wail of the first bag and the wall of the second bag contact each other and form the separator wall 122. At least a portion of the separator wall, for example the first bag, may be included in the counter portion 210 of the housing 200 or cartridge.

Figure 8:
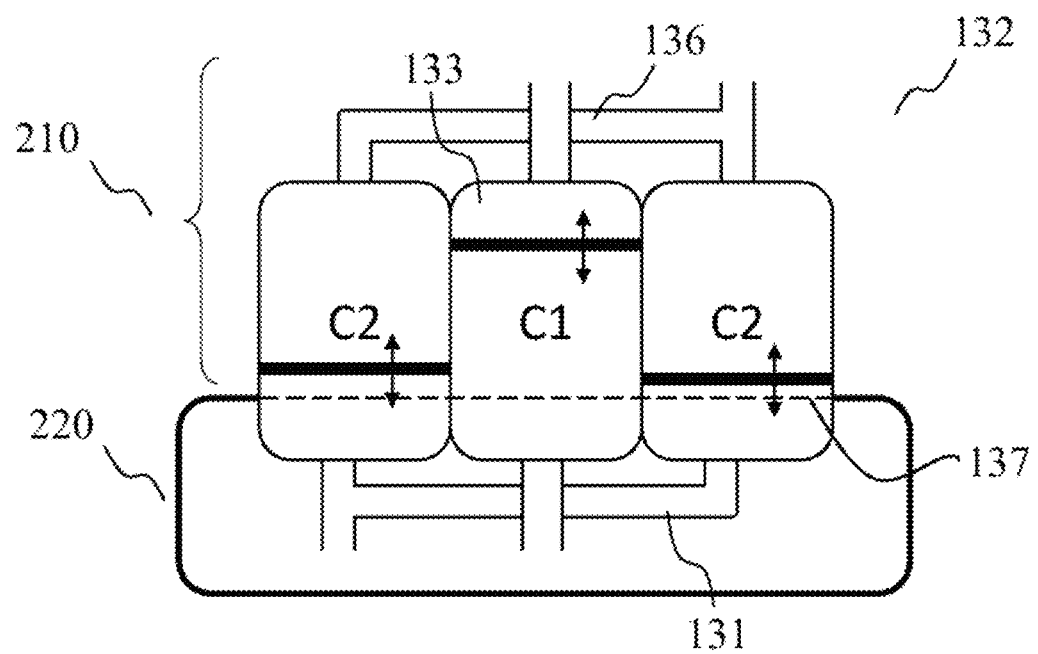
FIG. 8 illustrates details of a pump.

Details of a pump in accordance with various embodiments are described in connection with FIG. 8. FIG. 8 is a schematic drawing used for illustration purposes, however a pump in accordance with various embodiments is not limited thereto.

According to various embodiments the flow adjuster 130 may include a pump 132 (e.g. pump 132' or 132" as explained in connection with FIG. 4) to increase pressure.

According to various embodiments die pump 132 may include two pump chambers C1, C2 that may be configured, e.g., via one way valves and a pneumatic control system to alternately allow inflow of dialysate and to pump the dialysate out through an opening of a corresponding pump chamber.

According to various embodiments the pump 132 may, be pneumatic and to pump the dialysate may include applying pneumatic pressure on a side of a moveable pump wall that is opposite to a dialysate contacting side, for each of the two pump chambers C1, C2.

According to various embodiments the pump 132 may be connected to the housing 200. The housing 200 may include a counter portion 210 and a base 220 which may be releasable attachable to each other.

According to various embodiments one of the two pump chambers C2 may be divided into two chambers connected in parallel 131 to a pneumatic pressure receiving side.

Alternatively, or in addition, a hydraulic side of the two chambers may be connected in parallel 136 as well thus working as a single pump chamber C2. The two chambers may be disposed on opposite sides of the other one of the two pump chambers C1, so that tension applied to the housing 200 during pumping by one of the two pump chambers C1, C2 may be symmetrically at least partially distributed to the other one of the two pump chambers C2, C1. Thereby shear stress on the housing and/or pump may be reduced and longevity of the base may be increased.

According to various embodiments, the pneumatic pressure receiving side of the one of the two pump chambers and a further pneumatic pressure receiving side of the other one of the two pump chambers may be disposed on the base 220. For example, a line 137 may indicate the separation where both parts of the pump chambers meet.

According to various embodiments, the base 220 may be reusable and may include control elements, e.g., pneumatic and/or electronic control elements. The counter portion 210 may include disposable elements hydraulic circuit elements, e.g. all components of which a surface contacts dialysate.

According to various embodiments, the base 220 may be reusable. The counter portion 210 of the housing 200 may include a replaceable, e.g., single use cartridge. The housing 200 may further include a cover 221, e.g, a lid. The lid may be hinge connected and may secure the cartridge onto the base.

The dialysate regenerator according to the present disclosure may include a purification means, which may be, for example, a toxin removal means, and exemplified by a purification compartment. As used herein, and in accordance with various embodiments, the term 'purification means' may refer to a compartment that can contain one or more sorbent materials. The purification means may also include electro-oxidation means, electro-dialysis means or other purification means that are not based on sorbent technology. The compartment can be connected to a dialysate flow path. The sorbent materials in the purification means are used for removing specific solutes from solution, such as urea. The purification means can have a single compartmental design wherein all sorbent materials necessary for performing dialysis are contained within the single compartment. Alternatively, the purification means can have a modular design wherein the sorbent materials are dispersed across at least two different modules, which can be connected to form a unitary body. The purification means in the present disclosure may be a disposable purification means.

According to various embodiments the hydraulic circuit 110 may further include a sorbent cartridge. According to various embodiments the hydraulic circuit 110 may further include at least one reversible retainer including an ion reservoir. A direction of the dialysate flow through the reversible retainer may be reversible.

According to various embodiments, the dialysate regenerator may include one or more valves for alternating the dialysate flow path between a first flow phase from the dialysate inlet to the temporary storage volume via the reversible retainer; and a second flow phase from the via the temporary storage volume to the dialysate outlet via the purification means and the reversible retainer, wherein a direction of the dialysate flow path through the reversible retainer in the second flow phase is reverse to the direction of the dialysate flow path through the reversible retainers in the fast flow phase.

According to various embodiments, the dialysate regenerator may include a first reversible retainer upstream of the purification means and a second reversible retainer downstream of the purification means. According to various embodiments, the dialysate regenerator may include one or more valves tor alternating the direction of the dialysate flow path through the reversible retainer between a first direction and a second direction, the second direction being reverse to the first direction of the dialysate flow path through the reversible retainer.

The ion reservoir may be any chemical compound capable of retaining and releasing ions. Examples of such compounds may be an ion exchanger, an ion exchange membrane, an ion rejection membrane, etc. The retaining and releasing of the ions may be influenced by parameters of the dialysate, for example, by the pH value, the temperature, the pressure, the concentration, the toxin or electrolyte concentration, the density and the viscosity. According to one embodiment, the ion reservoir retains and releases ions dependent of the pH value. As used herein, and in accordance with various embodiments, the term 'ion' when used in connection with the ion reservoir may refer to a charged atom or molecule. In particular, the ion may be a cation. The ion may be a cationic atom. The ion may be a physiologically essential ion. The ion may comprise a cation of the second group of the periodic table. Advantageously, since the essential ion is selected from the second group of the periodic table, it has a higher valence than, for example, a cation from the first group of the periodic table. The higher valence, in turn, affects that the cation having a higher valence may have a greater affinity for the ion reservoir or the ion exchanger contained in the reversible retainer. The ion may comprise calcium. The ion may comprise magnesium. The ion may comprise potassium. The ions, such as calcium, magnesium and potassium, may be termed essential ions, due to their physiological relevance.

Figure 9:
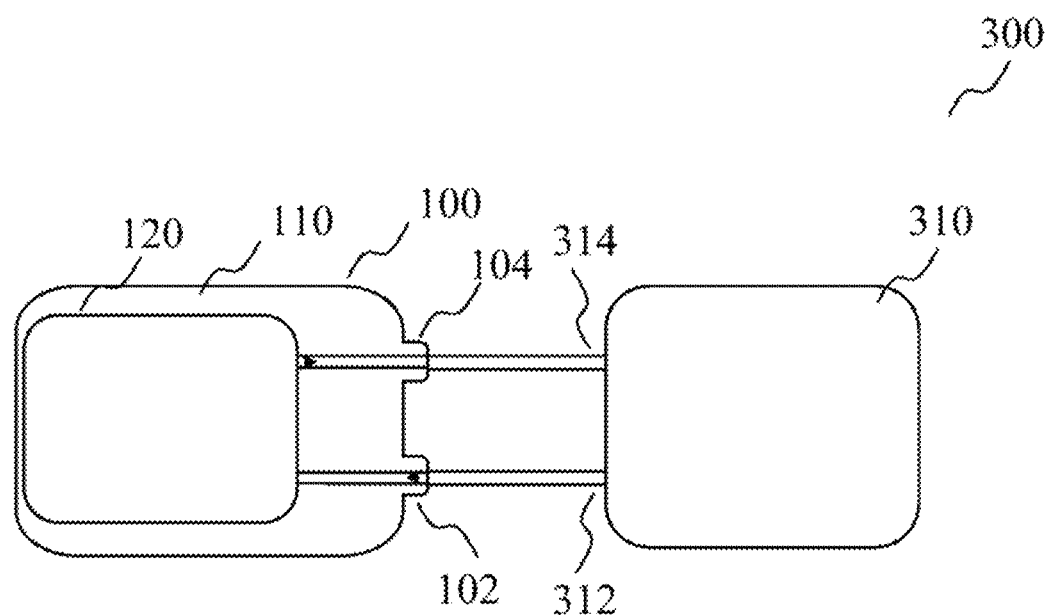
FIG. 9 shows a schematic of a dialysis system 300 in accordance with various embodiments.

FIG. 9 shows a schematic of a dialysis system 300 in accordance with various embodiments. According to various embodiments, a dialysis system 300 may include a dialysis apparatus 310 and the dialysate regenerator 100 in accordance with various embodiments. According to various embodiments, a dialysis apparatus 310 may include a fresh dialysate input 314 and a spent dialysate output 312. The regenerator inlet 102 may be coupled to the spent dialysate output 312 for receiving spent dialysate, and wherein the regenerator outlet 104 may be coupled to the fresh dialysate input 314 for dispensing regenerated dialysate. Thus, dialysate regeneration may be provided without any alteration to an existing dialysis apparatus.

The dialysate regenerator includes a fluid portioning system, which is based on the principle of partitioning a dialysate flow of unknown flow rate into aliquots of known volume ('Dialysate Dose Volume'), and optionally mixing each aliquot with a defined volume of infusate ('Infusate Dose Volume').

The aliquots may be determined with the help of the fluid portioning system, for example, a chamber (e.g., a rigid chamber) containing two distinct compartments (the first compartment and the second compartment), which are separated by a movable separator wall, such as a flexible membrane. Each compartment may be connected to a separate opening in the chamber, allowing fluid to flow into or out of the compartment. The separator wall can he moved to either side of the rigid chamber such that the volume of the individual compartments can vary between zero and the entire volume of the chamber. The sum of the volumes of both compartments is always equal to the volume of the chamber (the 'Dialysate Dose Volume'). When in use, the system can be present in two alternated states, the first state ST1 and the second state ST2. In the first state ST1, fluid flow is guided into the first compartment via the first opening, thus displacing fluid contained in the second compartment and forcing it to leave the chamber via the second opening. Once the first compartment fills the entire chamber (i.e. the second compartment is empty), there is no more volume for expansion of the first compartment, resulting in an increase of fluid pressure in the first compartment. The first chamber now contains exactly one aliquot volume of fluid, equal to the volume of the rigid chamber. The pressure increase may be detected by a pressure sensor, and may further be used to switch an inverting valve arrangement, e.g. consisting of one 3-way valve or two 2-way valves connected to either opening of the rigid chamber. The valves may be controlled pneumatically or electromechanically (e.g. using solenoids or servos). The switching of the valve assembly puts the system into the second state ST2: the fluid flow direction is inverted such that fluid is directed into the second compartment through the second opening of the chamber, while the fluid contained in the first compartment (corresponding to one aliquot equal to the volume of the rigid chamber) is drained through the first opening. The system then remains in this state until a renewed increase of fluid pressure indicates that the first compartment is completely emptied, and the second compartment now contains exactly one aliquot equal to the volume of the chamber. The inverting valve assembly is switched again, and the process continues again in the first state ST1. This action allows dividing a flowing fluid of unknown flow rate into uniform aliquot volumes, which each are equal to the volume of the chamber.

The aliquots of purified dialysate can then accurately be mixed with a fixed volume of infusate ('Infusate Dose Volume'). This fixed infusate volume is determined similarly to the determination of the dialysate volume aliquots. A chamber (e.g. a rigid chamber) may be separated into two compartments by a movable separator wall, wherein each compartment is connected to a separate opening in the chamber, allowing infusate to flow into or Out of the compartment. An inverting valve arrangement, e.g., including one 3-way valve or two 2-way valves at either opening of the rigid chamber can again be present: in two alternating positions, which are switched in correspondence to the two possible states described above. This allows to accurately dispense one dose of the infusate solution, equal to the volume of the chamber of the dispensing means ('Infusate Dose Volume'), with each switch of the valve assembly. In order to provide the driving force to fill a compartment of the infusate dose volume, the pressure of the infusate solution must be higher than the pressure in the fluid line into which the contents of the other compartment is dispensed. This can easily be achieved, for example, by providing infusate solution from a closed reservoir container, which is pressurised with air pressure.

In an alternative embodiment, the infusate dose volume may also be used to dispense a volume of infusate solution, and concurrently drain an equivalent volume of excess dialysate. In this arrangement, a first state of the system will see the filling of a first compartment with dialysis fluid taken from a point immediately upstream of the sorbent compartment, where the fluid pressure is high. The second compartment includes infusate solution, which is dispensed to the purified dialysate, using the high pressure in the first compartment as driving force. When the system is in the second state, the contents of the first compartment may be drained into a drain container, and the second compartment is filled with infusate solution. The driving force for this filling can either come from gravity (hydrostatic pressure between infusate container and drain container), or again from pressurising a closed infusate solution reservoir.

Figure 10A:
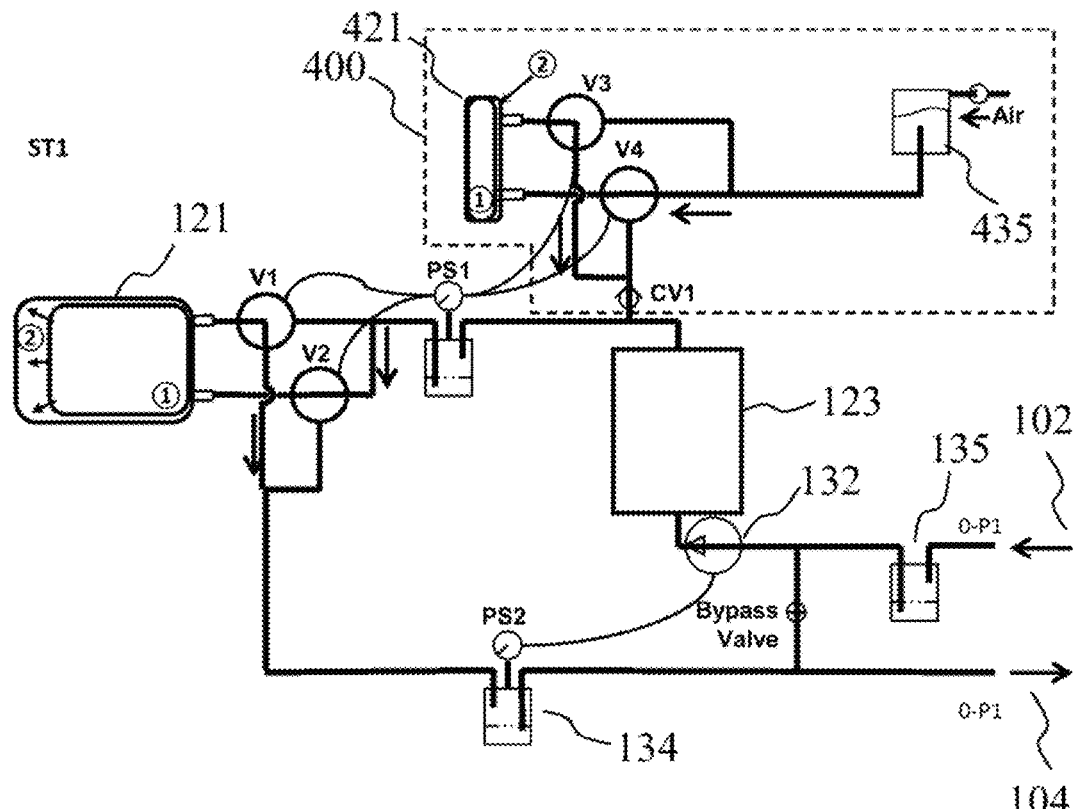
FIGS. 10A and 10B Show exemplary schematics according to embodiment 1 in the first state ST1 (FIG. 10A) and in the second state ST2 (FIG. 10B)
Figure 10B:
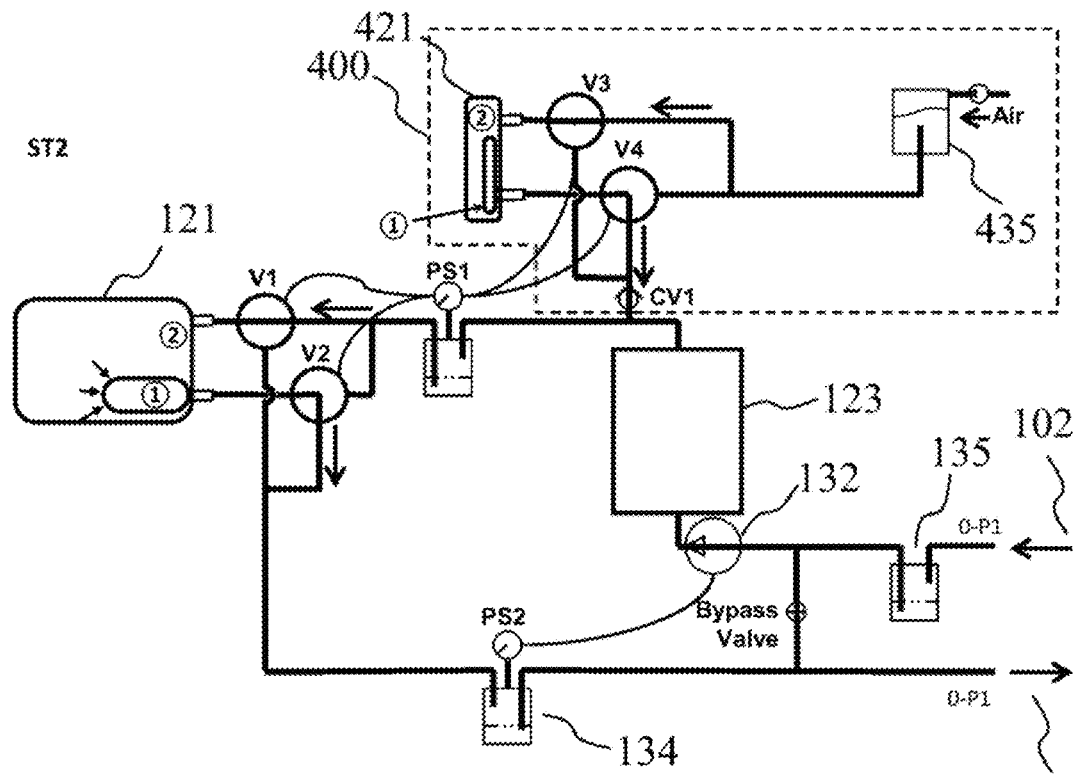

FIGS. 10A and 10B show exemplary schematics according to embodiment 1 in the first state ST1 (FIG. 10A) and in the second state ST2 (FIG. 10B). The regenerator inlet 102 allows for receiving used dialysate, e.g., from a dialysis apparatus, which may be stored in a dialysate reservoir 135. The external pressure at the regenerator inlet 102 may be within the range from 0 to P1, for example, P1 may be 7 kPa. Downstream from the inlet 102, the dialysate may pass a sorbent, e.g., in a sorbent cartridge 123. A pump 132 may increase the pressure of the dialysate after the reservoir. The pump may be controlled according to the external pressure PS2 of the regenerator outlet 104, for example, so that the external pressure PS2 of the regenerator outlet 104 is in the range from 0 and P1. Another dampener may be disposed downstream from the sorbent cartridge 123 and may measure a pressure PS1 of a selected input of the chamber 121 of the fluid portioning system, which in the first state ST1 may be compartment $\hat{1}$ which is being filled, while the other compartment $\hat{2}$ is being emptied. The selection of chambers may be carried out by valves, for example, the illustrated 3 way valves V1 and V2. Once compartment $\hat{1}$ is filled, the pressure sensor PS1 registers an increase in pressure, which increase may trigger the switching of an inverting valve arrangement, such as 3-way valves V1 and V2, into the second state ST2 as shown in FIG. 10B, wherein compartment $\hat{1}$ is being emptied, while the other compartment $\hat{2}$ is being filled. in both states, there is a flow of dialysate from the chamber 121 in direction to the regenerator outlet 104 (from different compartments of the chamber 121). The dampener with the pressure sensor PS2 may be disposed downstream from the chamber 121 and the inverting, valve arrangement.

In accordance with various embodiments, the dialysate regenerator may include an infusate closer which allows for mixing an additive (e.g. infusate) into the dialysate. As illustrated in FIGS. 10A and 10B, the infusate closer 400 may include an infusate reservoir 435 and an infusate portioning system, including, e.g., an additional inverting valve arrangement, e.g., 3-way valves V3 and V4, and dual compartment portioning chamber 421. The dual compartment portioning chamber 421 and the additional inverting valve arrangement may be configured and controlled analogously as the chamber 121 and the inverting valve arrangement, with the difference that the infusate aliquot is smaller than the dialysate aliquot. A mixing ratio is determined by the volume ratio of the dialysate aliquot vs the infusate aliquot.

Figure 11:
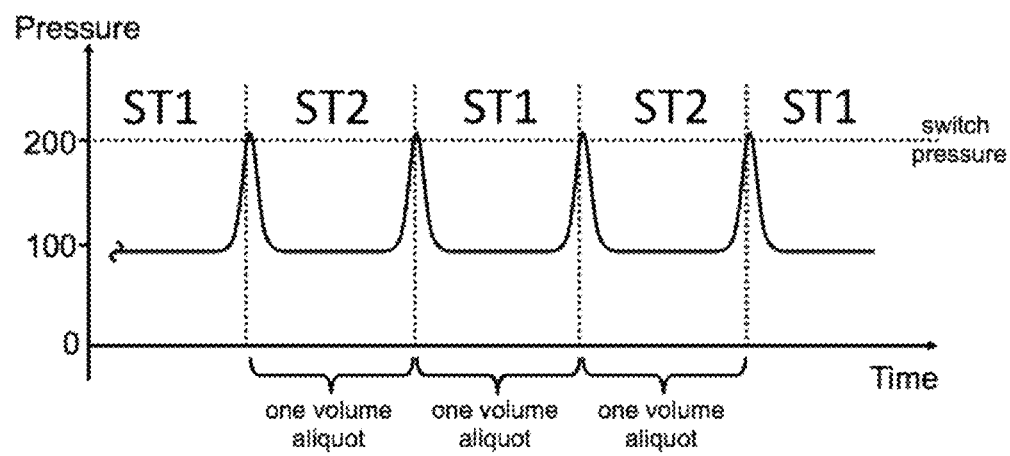
FIG. 11 shows an exemplary valve control principle, in a plot of pressure against time, wherein pressure may be the pressure at the compartment being filled.

FIG. 11 shows an exemplary valve control principle, in a plot of pressure against time, wherein pressure may be the pressure at the compartment being filled, for example PS1 in FIG. 10A. As can be seen, when the compartment is full, pressure raises (exemplified with a raise to 200 from 100), at which point (marked by the vertical dotted lines) a switching of state occurs (ST1⇆ST2).

The exemplary chamber 121 of the fluid portioning system 120 or the additional chamber (for the additive dosing) may, in various embodiments, include, e.g., be made up from, two rigid half-shells, sandwiching a flexible diaphragm. Alternatively, the two compartments may include, e.g., be made of, two fluid bags (e.g., two parallel fluid bags sharing one common bag wall) contained in a rigid chamber. The latter arrangement further opens the possibility to construct the rigid chamber from a wall of the disposable cartridge, locking against a profile located on the surface of the base, e.g., non-disposable cradle.

Figure 12A:
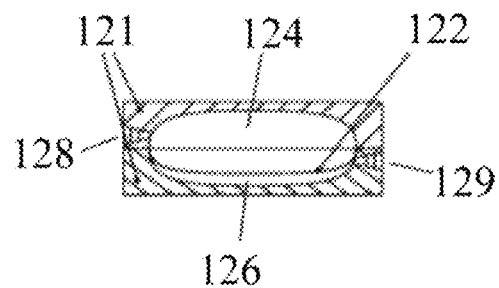
Figure 12B:
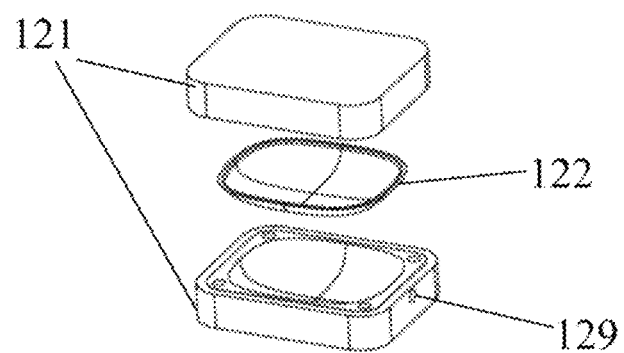

FIGS. 12A and 12B show an exemplary chamber 121 of the fluid portioning system 120. Wherein FIG. 12A shows the chamber 121 in assembled state and FIG. 12B shows the exemplary chamber in exploded view. The chamber 121 may include a movable separator wall 122 separating the interior of the chamber 121 into a first compartment 124 and a second compartment 126. The chamber 121 may further include a first opening 128 for allowing exchange of dialysate to and from the first compartment 124. The chamber 121 may further include a second opening 129 for allowing exchange of dialysate to and from the second compartment 126. The additional chamber for the additive closer may be constructed in an identical or similar way, by adapting the volume as required.

The inverting valve arrangement may be constructed from commercially available disposable 3-way taps, which mechanically engage with a servo motor on the non-disposable cradle. Alternatively, a membrane valve system with pneumatic pistons may be used to construct an inverting flow arrangement from 2-way membrane valves.

Figure 13:
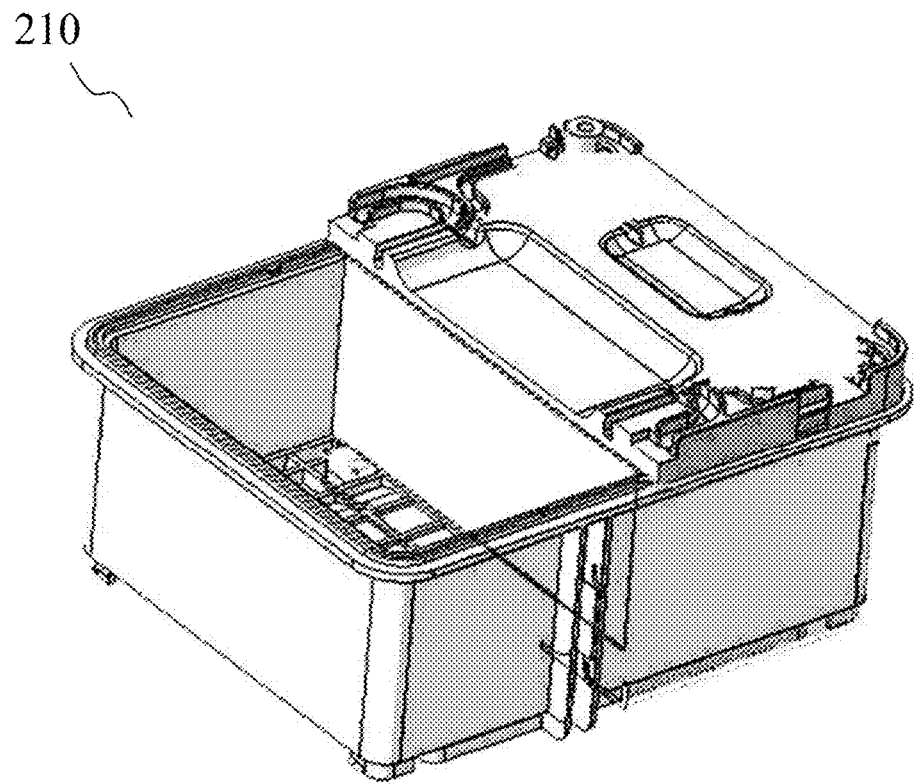
FIGS. 13 and 14 show an example of sorbent compartment in a cartridge as counter part 210 to the housing 200.
Figure 14:
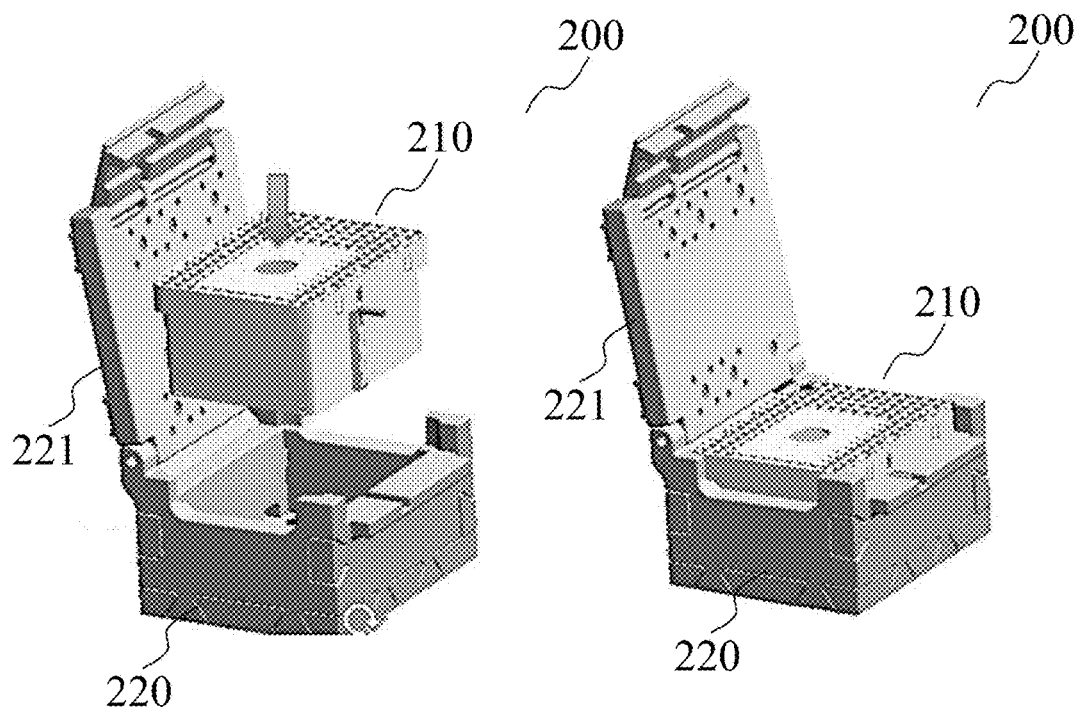

FIGS. 13 and 14 show an example of a sorbent compartment in a cartridge as counter part 210 to the housing 200. The dialysate regeneration takes place in the sorbent compartment. The cartridge may include body, top cover, check valves, and filters. FIG. 14 shows an example of a base, e.g., cradle, which receives the cartridge and may include the lower portion of the pump.

In some embodiments, to integrate the sorbent compartment with the other disposable components, its top cover may be designed in such a way that it also forms the lower portions (or parts) of the chamber 121 and the additional chamber 421. The bottom side of the sorbent compartment may form the upper portion (or part) of the pump, e.g., upper portion of the bellow pump cavity. Thus the disposable components, together with the membranes and/or bags may be combined into a single module as a disposable cartridge assembly.

Figure 15:
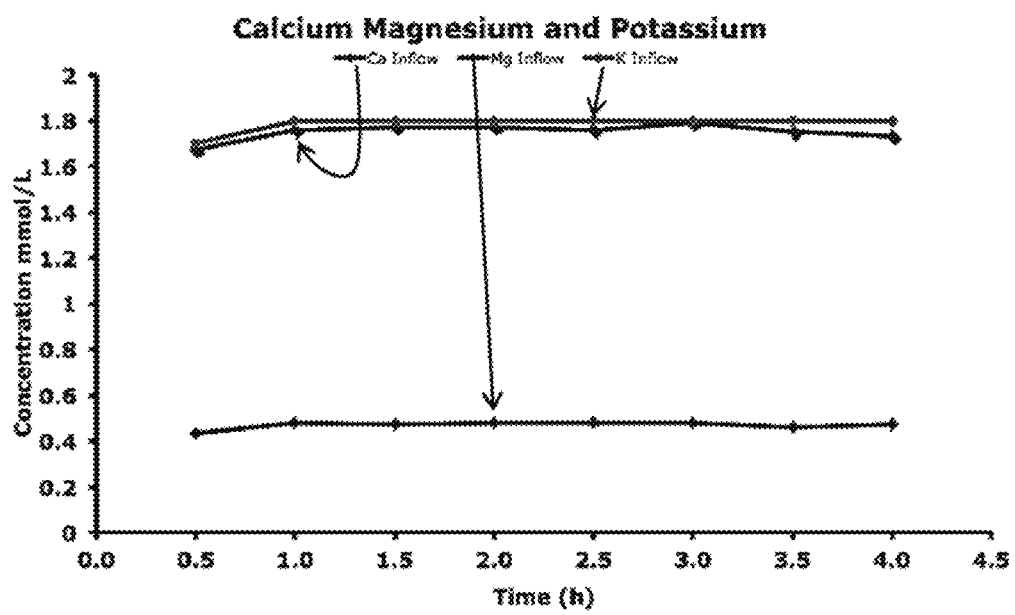
FIG. 15 shows the in-vitro dialysate composition after re-infusion of Ca, Mg and K.
Figure 16:
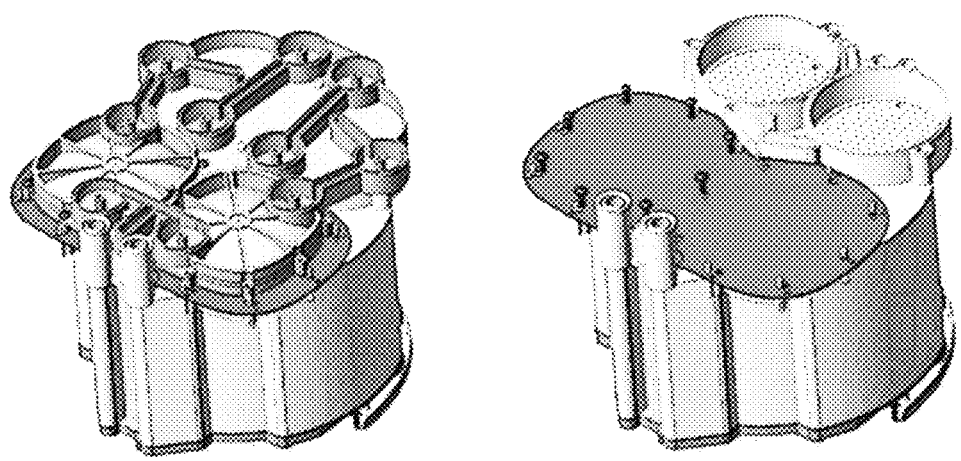
FIGS. 16 and 17 shows the pneumatic elements, wherein a part is shown in FIG. 16 and a schematic is shown in FIG. 17.
Figure 17:
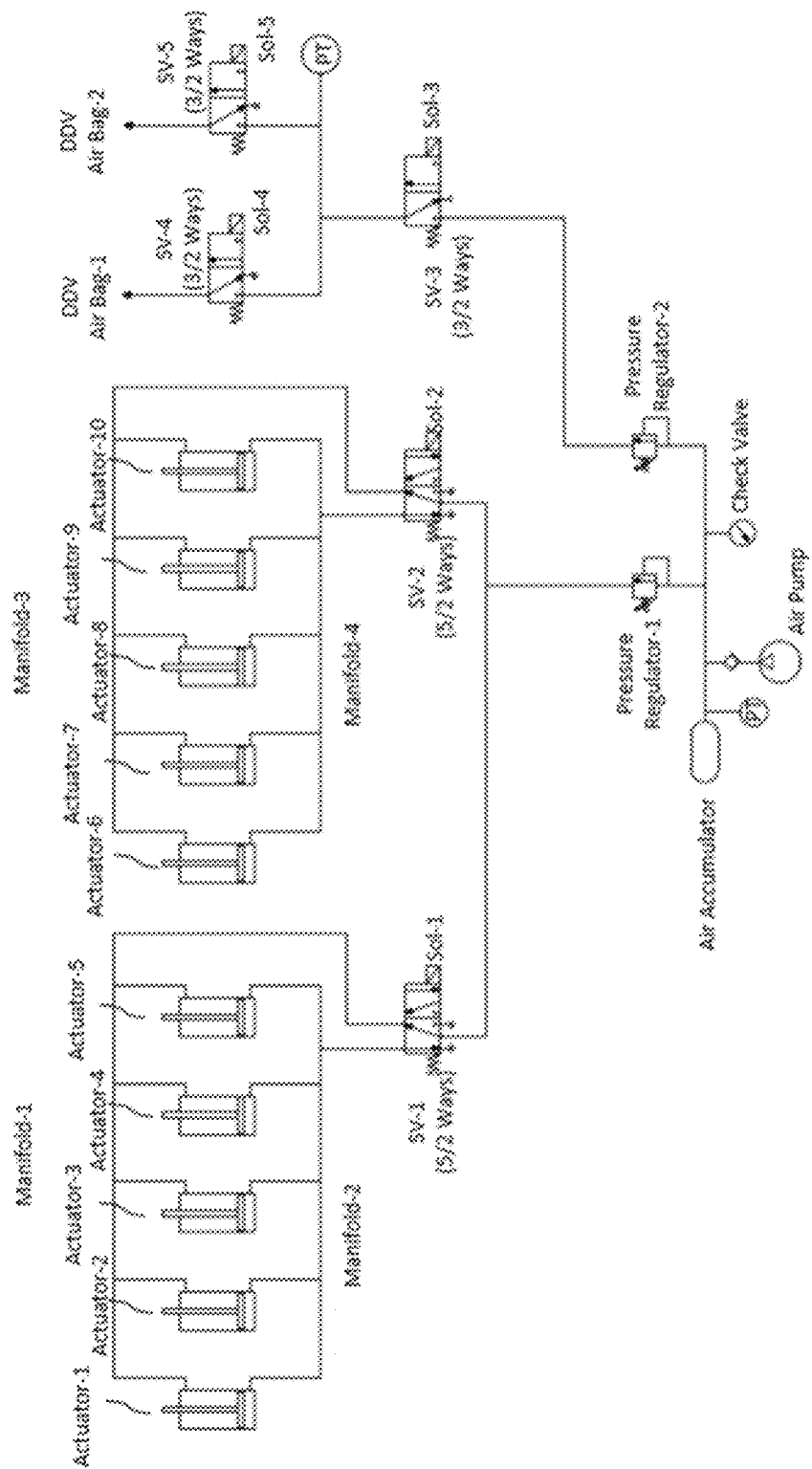

FIG. 15 shows the in-vitro dialysate composition after re-infusion of Ca, Mg and K;

FIGS. 16 and 17 shows the pneumatic elements, wherein a part is shown in FIG. 16 and a schematic is shown in FIG. 17.

According to various embodiments, the pump may include a force sensor which senses an internal pressure which may be used to detect whether the chamber (or compartment being filled) is full. For example, the pressure sensor may be integrated in the wall of the pump chamber.

According to various embodiments, the portioning system may include a force sensor which senses an internal pressure which may be used to detect whether the chamber (or compartment being filled) is full. For example, the pressure sensor may be integrated in the wall of the chamber used for dosing.

Figure 18:
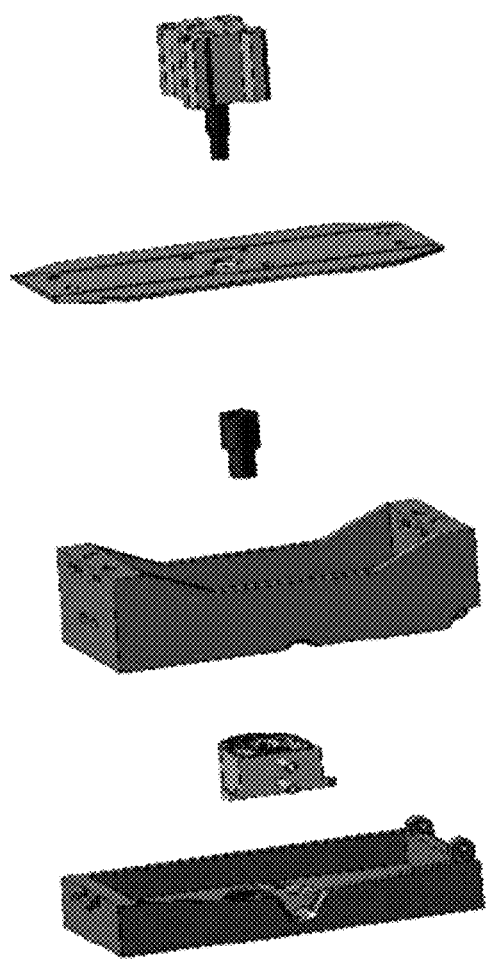
FIGS. 18 and 19 show a hydraulic circuit valve design (V1, V2, V3 and V4)
Figure 19:
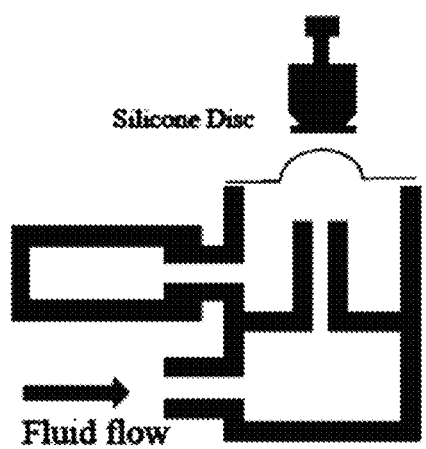

A hydraulic circuit valve design (V1, V2, V3 and V4) may be explained, in accordance with various embodiments. Each direction control valve (V1, V2, V3 and V4) in the integrated cartridge includes a rigid flow chamber, which is sealed by a flexible PVC membrane on one side (see, FIG. 18 and FIG. 19). The flow chamber had a fluid inlet channel and a fluid outlet channel. The inlet channel was located in close proximity to the flexible PVC membrane, such that pressing the flexible membrane onto the inlet channel opening could seal the channel. The pressing may be done with the help of pneumatic cylinders (one for each valve), which were equipped with silicone plungers. The valves are thus naturally open 2/2 valves, which can be closed by activating the pneumatic plungers. The optimum pressure setting for the pneumatic cylinder was determined for different fluid pressures and silicone plunger diameters.

In experiments, the preferred pneumatic cylinder was CJ2B6 from SMC as the size was deemed suitable in the whole integration design. The diameter of the valve inlet channel was 3 mm (Inner Diameter) and 6 mm (Outer Diameter). The test results are shown in the table 4 below:

| Silicone Disc Diameter (φ8 mm) | | |
|---|---|---|
| Fluid flow pressure | 0.6 bar | 1.0 bar |
| Cylinder pressure | 2.0 bar | 3.2 bar |
| Silicone Disc Diameter (φ7 mm) | | |
| Fluid Low pressure | 0.6 bar | 1.0 bar |
| Cylinder pressure | 1.8 bar | 2.8 bar |

Figure 20:
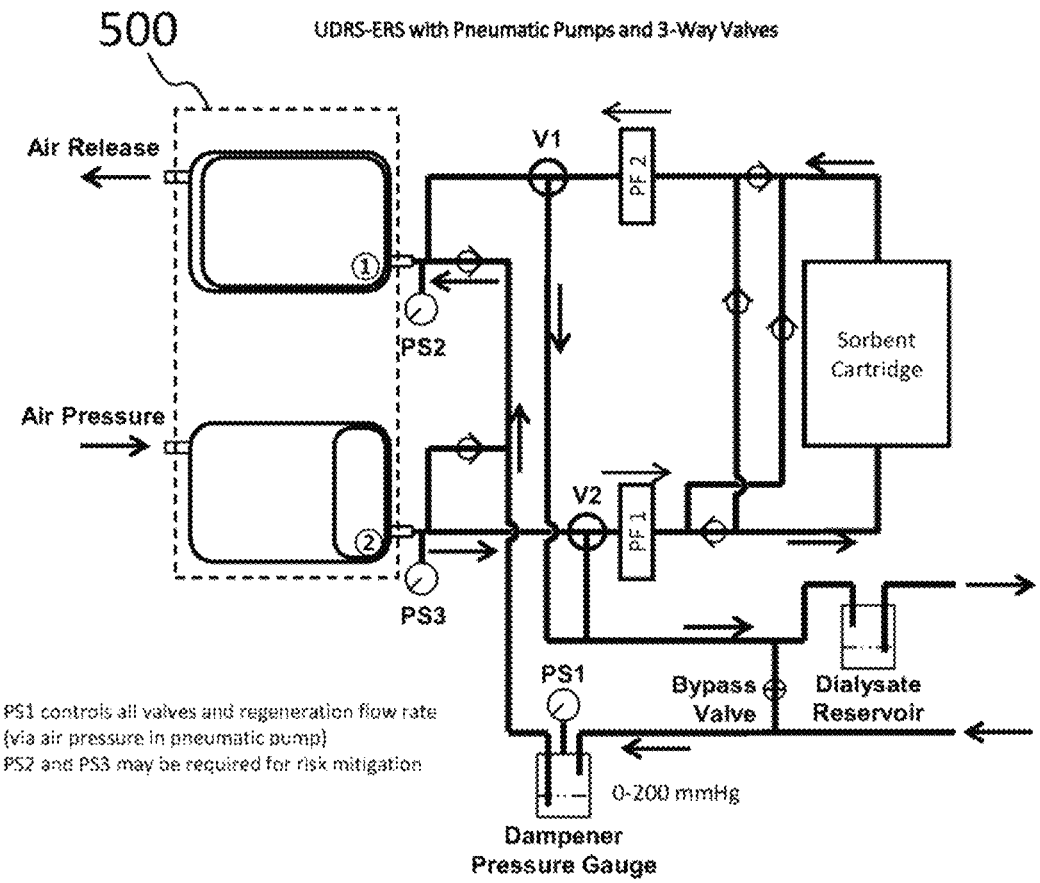
FIG. 20 shows a hydraulic flow diagram in which the portioning system and the pump are integrated into a dual pump.

FIG. 20 shows a hydraulic flow diagram in which the portioning system and the pump are integrated into a dual pump.

Simplified model studies done to gauge the accessible accuracy of a simplified component-level prototype were prepared as follows: a variation of the dialysate dose volume assembly was designed, which included 3 fluid bags: 2 for the 2 equal sized compartments for producing dialysis fluid aliquot volumes, and a third bag which could be filled with water to empirically optimize the available volume to the desired aliquot volume. Dialysate was replaced by tap water, the dialysate pump was replaced by an off-the-shelf lab peristaltic pump, the sorbent system was replaced by a flow resistor and the infusate was replaced by a concentrated solution of a blue dye. The dose accuracy of the system was then verified by measuring the concentration (i.e. the absorption intensity) of the blue dye in each aliquot of 'fresh' dialysate leaving the system. This test was repeated at different flow rates.

In another test, simulated purified dialysate (simulated dialysate after sorbent purification) was pumped through a resistor representing the flow resistance of an adsorber system, and was subsequently re-constituted with an actual infusate solution. In this experiment, the dose accuracy was evaluated by performing chemical analysis of collected 'fresh' dialysate at regular time intervals. FIG. 15, shows the in-vitro dialysate composition after re-infusion of Ca, Mg and K. The experiments have demonstrated the achievable accuracy and consistency of the proportioning system. The average proportioning ratio was very close to the target, and individual aliquots were subject to relatively small variations.

A complete prototype was constructed as explained in accordance with various embodiments and showed good results using dialysate in an animal model.

a dialysate regeneration compartment for purification of spent dialysate, e.g., by removal of uremic toxins and other unwanted solutes. The regenerator is configured to regenerate dialysate collected from connected dialysis apparatuses. The regenerator itself is not configured to perform a dialysis treatment. Spent dialysate is collected from the connected dialysis apparatuses, and fresh (regenerated) dialysate is provided to the connected dialysis apparatuses at a rate dictated by the set flow rate of the connected dialysis apparatuses. The dialysate regeneration device performs this task fully autonomous and there is no need for electronic communication or control between the dialysate regenerator and the connected dialysis apparatuses. The dialysate regenerator is intended to be used as an accessory to conventional dialysis apparatuses, extending their field of use to sorbent regenerative dialysis without the need for modification of the conventional dialysis apparatuses. This significantly reduces the development effort and regulatory effort typically required for sorbent-based regenerative dialysis apparatuses.

The regenerator may optionally include any combination of the following:
- a fluid portioning system which may include a valve system to divide a dialysate flow into uniform portions for sequential regeneration;
- a dispensing system for addition of a desired ratio of a concentrate solution of an additive, e.g., infusate;
- a valve system to direct the fluid flow in alternate fluid pathways, or to invert the flow direction in parts of the fluid pathway;
- additional filter(s) or adsorber compartment(s);
- pumping means to transport spent dialysate from the regenerator inlet through the regeneration compartment to the regenerator outlet;
- control means to regulate the dialysate regeneration rate. This control means may include level detectors or pressure sensors at inlet or outlet and electronic control means to regulate the pump speed in response to fluid demand or supply by connected dialysis apparatus;
- sensing means to detect harmful conditions in regenerated dialysate, e.g. an ammonia sensor or electrolyte sensor;
- a reservoir volume ("inlet reservoir") for receiving spent dialysate from a conventional dialysis machine, such as an HD or PD machine;
- a reservoir volume ("outlet reservoir") for receiving regenerated dialysate for withdrawal by a conventional dialysis machine;

In some embodiments, the regeneration device has a volume of from 10 dL to 50 dL, for example from 20 dL to 30 dL and a dry weight of from 1 kg to 10 kg, for example from 2 kg to 6 kg.

The fluid portioning system may include one or more of:
- a chamber, which may be rigid, which is separated into two compartments by a movable separator wall, such as a flexible membrane, wherein each compartment is connected to a separate opening in the chamber, allowing fluid flow into or out of the compartment;
- an inverting valve arrangement connected to the two openings at the rigid chamber;
- means to switch the inverting valve arrangement in dependence of fluid pressure;
- additive dispensing means;
- drain means for draining of excess fluid;
- the separator wall can be moved to and from either side of the chamber such that the volume of the individual compartments can be varied between zero and the total volume of the chamber. The sum of the volumes of both compartments is always equal to the volume of the chamber, allowing dividing the fluid into uniform portions, which are equal to the volume of the rigid chamber.

These volumes can then be accurately mixed with a fixed volume of additive e.g., infusate, dispensed from the additive dispensing means. The additive dispensing means may be controlled mechanically using the force of the increased fluid pressure (e.g. using a piston pump), or electronically using a pressure sensor, valves and electronic control means. For example, the additive dispensing means may be constructed from an additional chamber, which is separated into two compartments by a movable separator wall, wherein each compartment is connected to a separate opening in the additional chamber, allowing additive to how into or out of the compartment, valves connected to the two openings at the additional chamber, and means to switch the valves in dependence of the fluid pressure in the main fluid line.

Alternatively, the uniform portions of fluid may be regenerated by passing them through individual sorbent compartments, additional filters or adsorber compartments The additional filters and adsorber compartments may be configured in a way suitable to allow fluid regeneration without the need for concentrate proportioning or additive dispensing means.

Rather than developing a whole new dialysis device from scratch, the present disclosure allows a conversion of existing dialysis apparatuses into sorbent-based regenerative devices, freeing them from the key handicap of conventional dialysis apparatuses (e.g. HD), namely the requirement for large quantities of highly pure water or dialysate. This conversion is achieved without requiring major, or any, changes in the physical and electronic make-up of existing dialysis apparatuses.

The dialysate regenerator acts as an accessory to existing dialysis apparatuses, collecting spent dialysate from the drain, regenerating it into fresh apparatus, and feeding this fresh dialysate back to the dialysis apparatus. The development efforts for the regenerator can be focused on optimizing the mechanisms of sorbent re-generation and/or electrolyte re-infusion only. This provides a shorter path to providing patients with HD need (e.g., home HD), than the development of a completely new dialysis apparatus. As an added benefit, doctors, nurses and patients who are already familiar and comfortable with the existing apparatuses, will have less hesitation to run these apparatuses in a sorbent-regenerative mode using the dialysate regenerator as an accessory device.

The dialysate regenerator is able to universally interface with various dialysis apparatuses, including HD and PD machines. The dialysate regenerator can be based on established sorbent technology and provides an accelerated pathway to bringing this technology to the patient, combining it with the established safety of existing dialysis apparatuses.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A dialysate regenerator for connecting to a dialysis apparatus, the dialysate regenerator comprising:
   a regenerator inlet for receiving dialysate;
   a regenerator outlet for dispensing regenerated dialysate; and
   a hydraulic circuit connected between the regenerator inlet and the regenerator outlet comprising a purification means configured to convert spent dialysate into the regenerated dialysate, and further comprising a fluid portioning system to divide a dialysate flow into uniform portions for sequential regeneration,
   wherein the sequential regeneration comprises two alternate states (ST1, ST2) comprising a first state (ST1) and a second state (ST2), and the fluid portioning system comprises:
   a chamber comprising:

a movable separator wall separating the interior of the chamber into a first compartment and a second compartment:
a first opening for allowing exchange of dialysate to and from the first compartment; and
a second opening for allowing exchange of dialysate to and from the second compartment,
wherein the fluid portioning system is configured to allow dialysate flow from the regenerator inlet to one of the first and second compartments in the first state (ST1) and to the other one of the first and second compartments in the second state (ST2), wherein dialysate ingress into the one compartment causes displacement of the movable separator wall and dialysate egress from the other compartment.

2. The dialysate regenerator of claim 1, wherein the hydraulic circuit further comprises a flow adjuster configured to detect an external flow or an external pressure from one or both of the regenerator inlet and the regenerator outlet and to adjust an internal flow or an internal pressure so that the external flow remains unchanged.

3. The dialysate regenerator of claim 2, further comprising a housing, wherein the housing comprises a base and a counter portion which are releasably attachable to each other,
wherein the chamber comprises a base part and a counter part, the base part comprised by the base of the housing,
wherein the counter part and the base part of the chamber are attached together when the counter portion and the base are attached to each other.

4. The dialysate regenerator of claim 3, wherein the counter part of the chamber is comprised by a replaceable cartridge and the base is reusable.

5. The dialysate regenerator of claim 1, wherein the separator wall is a membrane.

6. The dialysate regenerator of claim 5, wherein the membrane is pre-shaped and is flipable between a first membrane side being convex in the first state (ST1) and a second side being convex in the second state (ST2).

7. The dialysate regenerator of claim 5, wherein
the first compartment comprises a first bag fluidly connected to the first opening and wherein the separator wall is a wall of the first bag, or
the second compartment comprises a second bag fluidly connected to the second opening and wherein the separator wall is a wall of the second bag,
or a combination of the above, in which the wall of the first bag and the wall of the second bag contact each other and form the separator wall.

8. The dialysate regenerator of claim 2, wherein the flow adjuster comprises a pump to adjust pressure or to adjust internal flow.

9. The dialysate regenerator of claim 8, wherein the pump comprises two pump chambers (C1, C2) that are configured to alternately allow inflow of dialysate and to pump the dialysate out through an opening of a corresponding pump chamber.

10. The dialysate regenerator of claim 9, wherein the pump is pneumatic and to pump the dialysate comprises applying pneumatic pressure on a side of a moveable pump wall that is opposite to a dialysate contacting side, on the corresponding pump chamber (C1, C2).

11. The dialysate regenerator of claim 9, further comprising a housing, wherein the pump is connected to the housing, and wherein the housing comprises a counter portion and a base which are releasably attachable to each other.

12. The dialysate regenerator of claim 11, wherein one of the two pump chambers (C2) is divided into two chambers connected in parallel to a pneumatic pressure receiving side and wherein the two chambers are disposed on opposite sides of the other one of the two pump chambers (C1), so that tension applied to the housing during pumping by one of the two pump chambers (C1, C2) is symmetrically distributed to the other one of the two pump chambers (C2, C1).

13. The dialysate regenerator of claim 3, wherein the base is reusable and comprises control elements and the counter portion comprises disposable elements.

14. The dialysate regenerator of claim 3, wherein the base is reusable, the counter portion of the housing comprises a replaceable cartridge.

15. The dialysate regenerator of claim 1, further comprising a regeneration compartment comprising the purification means.

16. The dialysate regenerator of claim 1, wherein the purification means comprises an adsorption filter.

17. The dialysate regenerator of claim 1, further comprising an additive doser configured to mix an additive into the dialysate, the additive doser comprising an additive portioning system synchronized with the fluid portioning system that portions the dialysate.

18. The dialysate regenerator of claim 1, wherein the hydraulic circuit further comprises:
at least one reversible retainer comprising an ion reservoir.

19. The dialysate regenerator of claim 1, wherein the purification means comprises a sorbent cartridge.

20. A dialysis system comprising
a dialysis apparatus comprising:
a fresh dialysate input;
a spent dialysate output; and
the dialysate regenerator of claim 1,
wherein the regenerator inlet is coupled to the spent dialysate output for receiving spent dialysate, and wherein the regenerator outlet is coupled to the fresh dialysate input for dispensing regenerated dialysate.

* * * * *